United States Patent
Watanabe et al.

(10) Patent No.: US 8,036,078 B2
(45) Date of Patent: Oct. 11, 2011

(54) OPTICAL DISC APPARATUS AND OPTICAL PICKUP

(75) Inventors: Katsuya Watanabe, Nara (JP); Shinichi Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 161 days.

(21) Appl. No.: 12/193,072

(22) Filed: Aug. 18, 2008

(65) Prior Publication Data
US 2009/0059761 A1    Mar. 5, 2009

(30) Foreign Application Priority Data
Aug. 30, 2007  (JP) ................. 2007-223421

(51) Int. Cl.
*G11B 7/00* (2006.01)
(52) U.S. Cl. .................. 369/53.12; 369/53.15
(58) Field of Classification Search ............... 369/53.12, 369/53.13, 53.14, 53.15, 53.11, 53.17, 53.16, 369/53.42
See application file for complete search history.

(56) References Cited

U.S. PATENT DOCUMENTS

| | | | | |
|---|---|---|---|---|
| 5,485,444 A | * | 1/1996 | Kuhn et al. | 369/53.15 |
| 5,526,341 A | * | 6/1996 | Shiba et al. | 369/275.1 |
| 6,024,287 A | * | 2/2000 | Takai et al. | 235/493 |
| 7,023,777 B2 | * | 4/2006 | Miyazaki et al. | 369/53.13 |
| 2008/0130442 A1 | | 6/2008 | Kikugawa et al. | |
| 2010/0097906 A1 | | 4/2010 | Watanabe et al. | |
| 2010/0226226 A1 | | 9/2010 | Watanabe et al. | |
| 2010/0254231 A1 | | 10/2010 | Watanabe et al. | |

FOREIGN PATENT DOCUMENTS

| | | |
|---|---|---|
| JP | 10-275449 | 10/1998 |
| JP | 2004-272966 | 9/2004 |
| JP | 2006-179136 | 7/2006 |
| WO | 2008/007646 A1 | 1/2008 |

OTHER PUBLICATIONS

Co-pending U.S. Appl. No. 12/301,832 filed Nov. 21, 2008.

* cited by examiner

*Primary Examiner* — Nabil Z Hindi
(74) *Attorney, Agent, or Firm* — Renner, Otto, Boisselle & Sklar, LLP

(57) ABSTRACT

An optical disc apparatus according to the present invention includes: an optical pickup including an optical system that converges a light beam on an optical disc and a photodetector that detects light reflected from the optical disc; and a fingerprint detector for detecting, based on the output of the photodetector, multiple fingerprint dots on the surface of the optical disc. The fingerprint detector confirms the presence of a fingerprint on the optical disc on sensing the output of the photodetector change according to the pattern of the fingerprint dots.

14 Claims, 14 Drawing Sheets

INTENSITY OF LIGHT REFLECTED FROM DVD

INTENSITY OF LIGHT REFLECTED FROM BD

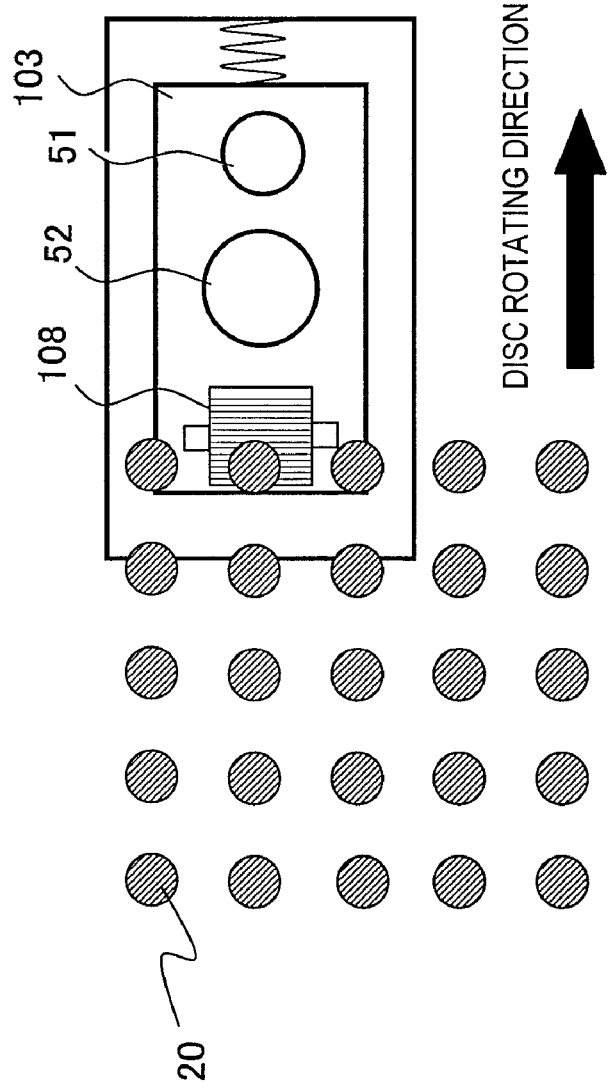
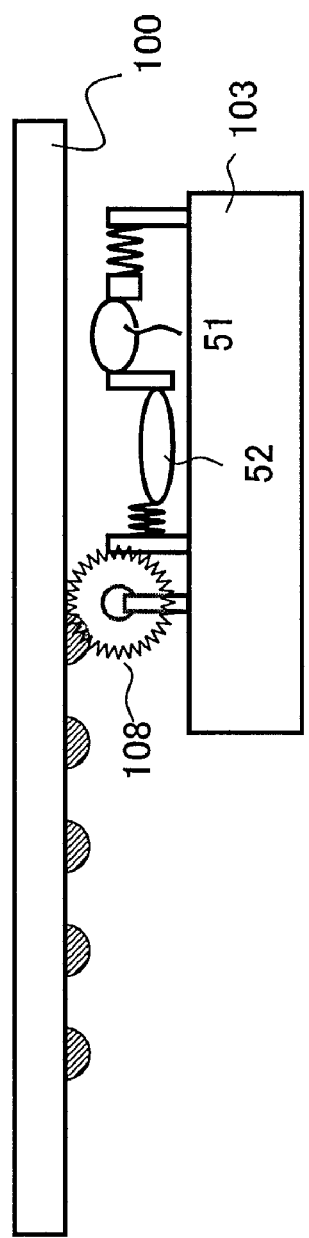
FIG. 10A
FIG. 10B

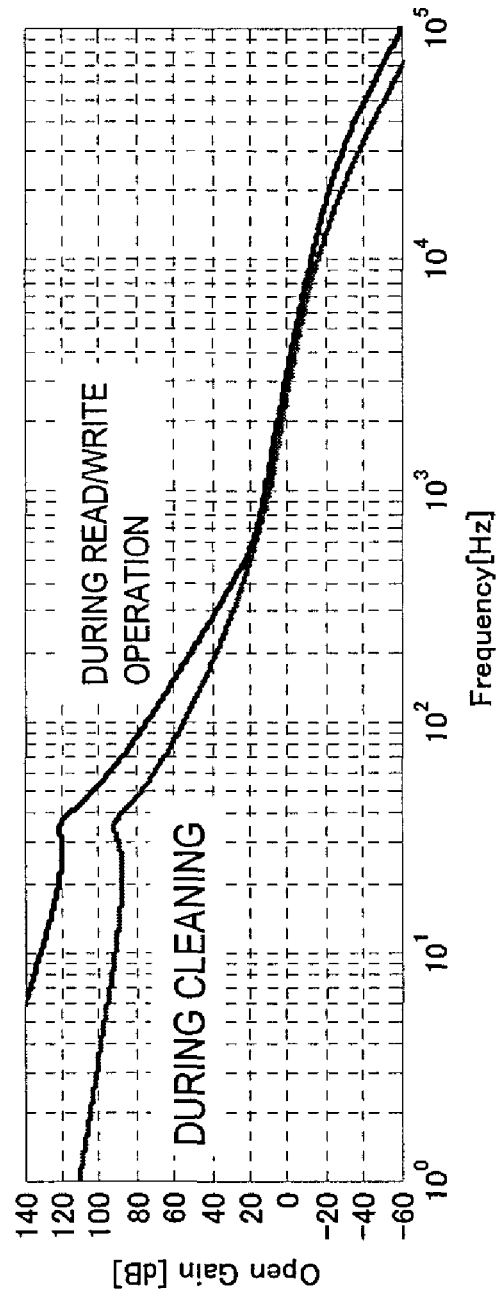
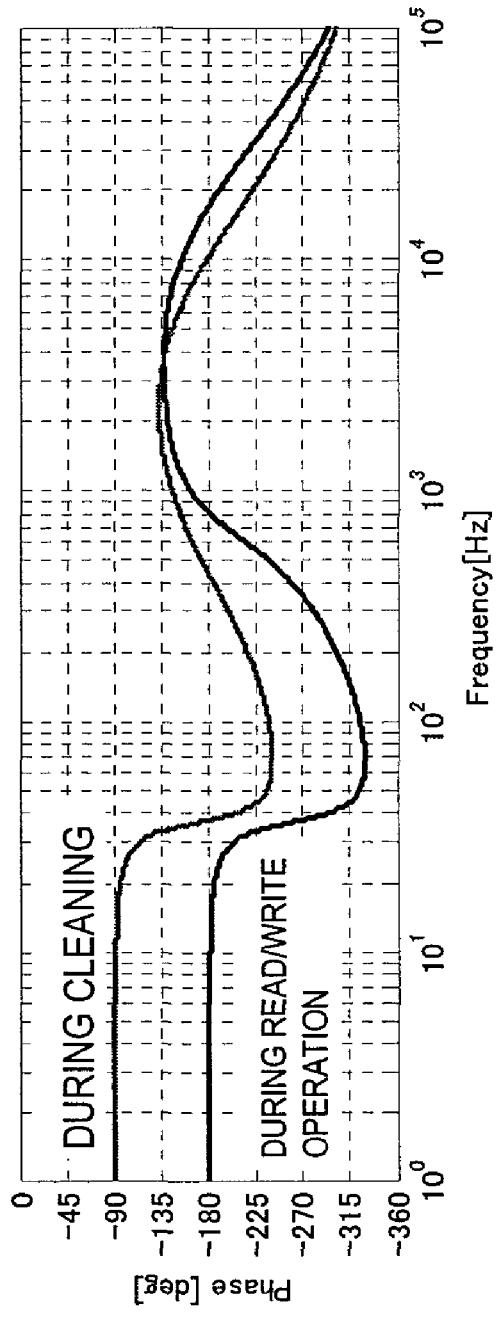
FIG. 11A
FIG. 11B

OPTICAL DISC APPARATUS AND OPTICAL PICKUP

BACKGROUND OF THE INVENTION

1. Field of the Invention

The present invention relates to an optical disc apparatus and an optical pickup. More particularly, the present invention relates to an optical disc apparatus and an optical pickup that can accurately locate a fingerprint on an optical disc by detecting a dot-to-dot gap of the fingerprint with a narrow converged beam spot.

2. Description of the Related Art

In optical disc technologies, data can be read out from a rotating optical disc by irradiating the disc with a relatively weak light beam with a constant intensity, and detecting the light that has been modulated by, and reflected from, the optical disc.

On a read-only optical disc, information is already stored as pits that are arranged spirally during the manufacturing process of the optical disc. On the other hand, on a rewritable optical disc, a recording material film, from/on which data can be read and written optically, is deposited by an evaporation process, for example, on the surface of a substrate on which tracks with spiral lands or grooves are arranged. In writing data on a rewritable optical disc, data is written there by irradiating the optical disc with a light beam, of which the optical power has been changed according to the data to be written, and locally changing the property of the recording material film.

It should be noted that the depth of the pits, the depth of the tracks and the thickness of the recording material film are smaller than the thickness of the optical disc base material. For that reason, those portions of the optical disc, where data is stored, define a two-dimensional plane, which is sometimes called a "storage plane" or an "information plane". However, considering that such a storage plane actually has a physical dimension in the depth direction, too, the term "storage plane (information plane)" will be replaced herein by another term "information layer". Every optical disc has at least one such information layer. Optionally, a single information layer may actually include a plurality of layers such as a phase-change material layer and a reflective layer.

To read data that is stored on an optical disc or to write data on a rewritable optical disc, the light beam always needs to maintain a predetermined converging state on a target track on an information layer. For that purpose, a "focus control" and a "tracking control" are required. The "focus control" means controlling the position of an objective lens perpendicularly to the information layer (which direction will be referred to herein as a "substrate depth direction") such that the focus position (or focal point) of the light beam is always located on the information layer. On the other hand, the "tracking control" means controlling the position of the objective lens along the radius of a given optical disc (which direction will be referred to herein as a "disc radial direction") such that the light beam spot is always located right on a target track.

To get the focus control and tracking control done, a focus error or a tracking error needs to be detected based on the light reflected from an optical disc and the location of the light beam spot needs to be adjusted so as to minimize the error. The magnitudes of the focus error and the tracking error are respectively represented by a "focus error (FE) signal" and a "tracking error (TE) signal" that are generated based on the light reflected from the optical disc.

Once a fingerprint is left on the surface of an optical disc, the intensity of the reflected light will decrease when the light beam passes through that fingerprint. As a result, the intensity distribution of the light beam will decrease non-uniformly, thus causing a disturbance in the TE signal and producing tracking abnormality. Consequently, some type of tracking failure such as a track jump happens. Various techniques have been proposed so far to avoid such tracking failures. For example, according to Japanese Patent Application Laid-Open Publication No. 2006-179136, the decrease in the intensity of the reflected light is detected on a regular basis, and if any defect, including the presence of a fingerprint, has been detected, the user is notified of that, thereby avoiding predictable write failures. Meanwhile, if the user permits such a soiled disc, a read/write operation will be performed on it just as instructed by him or her. Furthermore, by providing means for avoiding a repetitive notification, an opportunity to perform a read/write operation just as planned can be guaranteed while avoiding write failures to be caused by the dirt on the disc.

Various types of optical discs such as DVD (digital versatile disc)-ROM, DVD-RAM, DVD-RW, DVD-R, DVD+RW and DVD+R have become more and more popular these days as storage media on which a huge amount of information can be stored at a high density. Meanwhile, CDs (compact discs) are still popular now.

To increase the storage density of an optical disc, the light beam that has been converged on the data plane of an optical disc preferably has as small a spot size as possible. The spot size of a light beam is inversely proportional to the numerical aperture NA of an objective lens for use to converge the light beam. Thus, by increasing the numerical aperture NA of the objective lens, the spot size of the light beam can be decreased. Meanwhile, Blu-ray Disc (BD) and other next-generation optical discs that have even higher storage density and even bigger storage capacity than the optical discs mentioned above have become more and more popular nowadays. A BD requires a larger objective lens NA than a DVD's and covers the surface of its information layer with a thin light transmitting layer with a thickness of approximately 100 μm. That is why compared to a DVD, a BD is more sensitive to dust, fingerprints and other sorts of defects because the light beam converged on the information layer of a BD is affected by such defects much more significantly than on a DVD.

In the prior art, not just the fingerprints but also various other defects such as dirt, grazes, scratches and dust on an optical disc are detected by sensing a decrease in the amplitude of a reflected light intensity (which will be referred to herein as an "RF amplitude"). That is to say, no matter what type of defect has been detected, the user is just notified of the presence of a defect on the disc. And he or she has no choice but to replace the disc with such a defect with another one.

However, in a situation where a scheduled recording operation is carried out while the user is away from home or after he or she has gone to bed at night with the recording schedule entered, even if the recorder tries to notify the user of the defect, he or she cannot replace the optical disc. In that case, the recorder cannot help either continuing the write operation on the optical disc, in which the defect has been detected, at the expense of the quality of the data stored, or stopping the write operation with an error message displayed.

Among other things, a BD is far more sensitive to scratches than a DVD is. Nevertheless, a BD is standardized as a bare optical disc. That is why even if only a tiny fingerprint were left accidentally on a brand-new BD that has just been removed from its case while it is loaded into a drive, a track jump or a write error would still be caused by the fingerprint.

What is worse, a fingerprint left on a BD could prevent the user from either writing data on it as intended or even reading data from it. As a matter of fact, results of experiments also revealed that a BD with a fingerprint had a significantly decreased RF amplitude and that a BD was much more sensitive to fingerprints than a DVD was. These results are quite understandable considering how a BD works in principle.

A fingerprint sometimes has as large a diameter as more than 10 mm. Thus, it is difficult to provide an alternative area that could substitute for the entire area with a fingerprint. In other words, if an area with a fingerprint were managed as a defective area without removing the fingerprint, the storage capacity of the optical disc would be wasted in vain. It has also been known that even if the area with the fingerprint is subjected to the same type of error correction processing as the one applied to a DVD, it is still difficult to correct the read/write errors that have been caused due to the presence of the fingerprint. That is why a BD has enhanced error correction ability. In addition, according to its initial standard (BD-RE: Ver. 1.0), a BD should be housed in a cartridge and non-removable from the cartridge to prevent the BD from being soiled with a fingerprint.

However, according to recent standards such as BD-RE: Ver. 2.0 and standards for BD-R and BD-ROM, a BD is supposed to be used as a bare optical disc (i.e., an optical disc without a cartridge) just like a CD or a DVD to meet the market needs. Thus, on the supposition that a fingerprint left on a BD should be wiped away manually with a cleaner such as a brush or a piece of cloth, the strength of the hard coating on the surface of a BD is defined by the Taber's scratch test. Furthermore, a cartridge in/from which a BD could be housed or removed is also defined to prevent the user from leaving a fingerprint on it.

Thanks to these standards and techniques, when a digital telecast is recorded on a BD or when a movie is played back from it, some errors could be caused due to the presence of a fingerprint or dust but would be just momentary noise that never persists long, thus achieving an acceptable level as far as a normal viewer's impression is concerned.

Meanwhile, in the field of personal computers (PCs), a user who uses a BD should be rather experienced and professional by now in handling various types of optical discs. And it is quite natural for such a person to handle a BD carefully enough to avoid spotting it with a fingerprint or dirt. More specifically, a PC user uses a BD in most cases to make a backup of data files that are stored on a hard disk. That is why if he or she is handling files with a PC by the drag-and-copy technique, for example, verification is automatically required after the files have been written. That is why if write errors were caused due to the presence of a fingerprint or dust, the verification would fail, thus letting the user know that the write errors have occurred. In that case, the user can avoid the write errors due to the presence of a fingerprint or dust by retrying writing a number of times until the verification succeeds.

As described above, various problems that could be caused by a fingerprint on a BD are not currently considered serious ones. However, the broader the applications of BDs and the greater the number of BD users, the more likely a fingerprint on a BD would raise a big issue. For example, to take advantage of the high storage density and big storage capacity of BDs fully, people are now exploring options to use them in industrial and medical applications. More specifically, banks may use them as archives to store a huge amount of customer data and market data. In medical fields, on the other hand, still pictures of CT scans and MRI, which have recently increased their definition significantly, and moving pictures shot with a gastric camera or an endoscope would be stored on BDs more and more often in the near future. In these applications, it is more strongly recommended to avoid those write errors one way or another.

More specifically, as for medical applications, it would be very difficult to remove an optical disc and clean it manually during a surgery or an inspection, for example. For that reason, in such applications, the dust or fingerprint should be cleanable automatically by a machine. Also, if the image data collected from a single patient is easily retrievable on a disc-by-disc basis (i.e., if the entire data about a single patient is managed on a single optical disc), then the person who is inspecting him or her can know more easily how much the disease has advanced, what will be the risks of complication in cases of surgery, or whatever has changed in him or her in general. In that case, the doctor can treat the patient more quickly and more appropriately without missing any little variation or symptom.

In that case, every time a patient is subjected to a surgery or inspection, high-definition moving pictures that have been shot with an endoscope or a gastric camera would be directly written on his or her dedicated optical disc without passing through any server computer or the hard disk drive of a PC. In such an application, even momentary noise is intolerable considering an affection that could be caused in the patient and the status of the diseased part of his or her parietal wall or gastric wall unlike the situation where a digital telecast needs to be recorded or a movie needs to be played as described above. That is why there will be an increasing demand for more reliable scheme and system than conventional ones.

Furthermore, as for car navigators, car BD players and other devices to be used in cars, a person who is driving a car is much more likely to leave a fingerprint on an optical disc to be newly loaded compared to a situation where a fixed recorder or player is used. According to a conventional technique, a defect, if any, is automatically detected during a disc loading process, and an alert "wipe the disc" is displayed to prompt the user to clean the disc. However, the same alert is also displayed even if the defect detected is just a graze or an uneven portion of the base member, not a fingerprint or dust, thus often making the user feel uncomfortable. What is more, the user cannot know exactly what part of the 12 cm disc needs to be wiped. That is to say, even if the user believes he or she has wiped the disc well, the wiped part does not always agree with the location where the fingerprint has actually been detected, and the same alert may be displayed over and over again.

In order to overcome the problems described above, the present invention dares to take advantage of the drawback of a BD that is more sensitive to fingerprints. And an object of the present invention is to provide an optical disc apparatus and an optical pickup with a cleaner that can notify the user exactly where on the optical disc a fingerprint has been detected, can wipe the fingerprint away automatically, and can transfer important data stored to an alternative location with no fingerprints by detecting the dots themselves of the fingerprint with a light beam spot very narrowly converged on the surface of the optical disc and locating the fingerprint accurately.

A more specific object of the present invention is to provide an optical disc apparatus and an optical pickup with a cleaner that ensure reliability that is high enough to use them even in industrial and medical applications with no problem.

SUMMARY OF THE INVENTION

An optical disc apparatus according to the present invention includes: an optical pickup including an optical system that converges a light beam on an optical disc and a photodetector that detects light reflected from the optical disc; and fingerprint detecting means for detecting, based on the output of the photodetector, multiple fingerprint dots on the surface of the optical disc. The detecting means confirms the presence of a fingerprint on the optical disc on sensing the output of the photodetector change according to the pattern of the fingerprint dots.

In one preferred, the fingerprint detecting means includes: a fingerprint detector that outputs a fingerprint signal indicating whether or not there is a fingerprint; and fingerprint processing means for determining the size of the fingerprint that the light beam has passed through and a radial location of the fingerprint on the optical disc in accordance with the fingerprint signal.

In another preferred embodiment, if the fingerprint detecting means has confirmed the presence of a fingerprint on the optical disc, the user is alerted to the presence either visually or audibly.

In still another preferred embodiment, the optical disc apparatus further includes fingerprint wiping means. If the fingerprint detecting means has determined that there is a fingerprint on the optical disc, the fingerprint wiping means wipes the fingerprint away.

In yet another preferred embodiment, the optical disc apparatus further includes: means for detecting defects other than fingerprints; and dust wiping means for wiping dust away from the optical disc.

In this particular preferred embodiment, if either the fingerprint detecting means or the means for detecting defects other than fingerprints has detected any defect, it is determined, by the waveform of a signal representing the defect, that either the dust wiping means or the fingerprint wiping means should wipe away the dust or the fingerprint that has been detected on the optical disc.

In yet another preferred embodiment, before management information is written on a management area on the optical disc, the fingerprint detecting means searches the management area for any fingerprint. If no fingerprints have been found in the management area, control means is notified of that result by the fingerprint detecting means and gets the management information written on the management area as it is. But if any fingerprint has been found in the management area, the control means is notified of that result by the fingerprint detecting means and chooses an alternative area from portions of the management area that have no fingerprints, and gets the management information written on the alternative area.

In yet another preferred embodiment, before management information is written on a management area on the optical disc, the fingerprint detecting means searches the management area for any fingerprint. If any fingerprint has been found in the management area, control means is notified of that result by the fingerprint detecting means, has the fingerprint wiping means wipe the fingerprint away from the management area, and then gets the management information written on the management area.

An optical pickup according to the present invention includes: an optical system for converging a light beam on an optical disc; a photodetector for detecting light reflected from the optical disc; and a fingerprint remover for wiping a fingerprint away from the optical disc in accordance with an instruction given by a control section of an optical disc apparatus.

In one preferred embodiment, the fingerprint remover includes a retractable brush and wipes the fingerprint away with the brush sticking out while cleaning the disc.

An optical disc apparatus according to the present invention can detect a fingerprint left on the surface of an optical disc separately from the other types of defects and can even detect exactly where the fingerprint has been left. As a result, the apparatus can convey a more plain and unequivocal message to the user or make automatic cleaning to wipe the fingerprint away.

Also, if equipped with both fingerprint wiping means and dust wiping means, the apparatus can remove both dust and fingerprints quickly and almost perfectly.

Furthermore, by finding an alternative area that can substitute for an area soiled with a fingerprint, a fingerprint-free area can be accessed just as intended. On top of that, since the fingerprint can be located accurately, the optical pickup can be moved to the vicinity of the fingerprint by driving a traverse motor and the fingerprint can be wiped away with a dedicated brush provided for the optical pickup. In that case, even if the user can neither replace optical discs nor wipe the fingerprint away in response to a notification of fingerprint detection because the recording operation is carried out without his or her attendance as is often the case with conventional recorders, the apparatus can wipe it away automatically. As a result, the quality of recording can be maintained consistently high.

Other features, elements, processes, steps, characteristics and advantages of the present invention will become more apparent from the following detailed description of preferred embodiments of the present invention with reference to the attached drawings.

Figure 5:
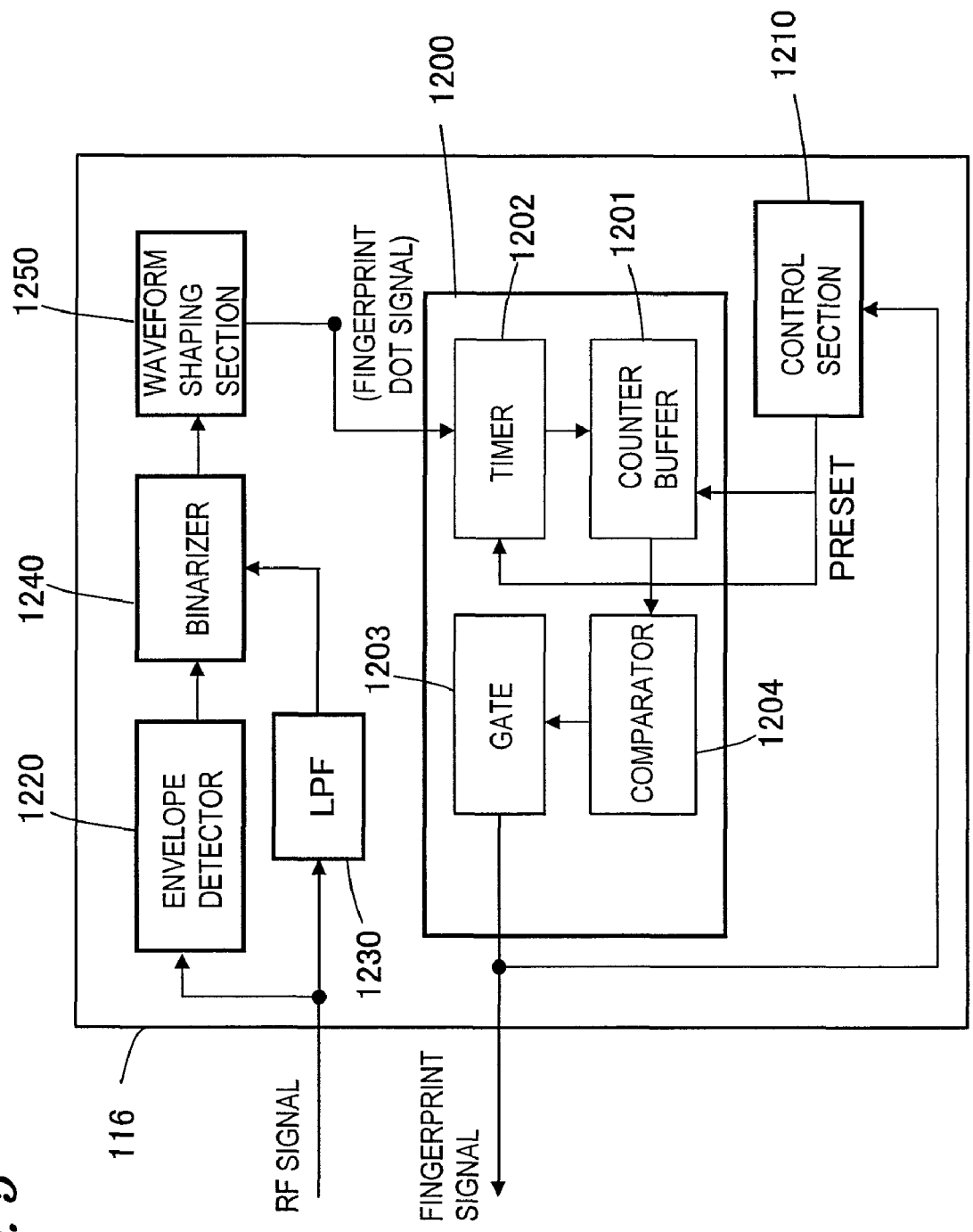
FIG. 5 is a block diagram illustrating the detailed configuration of the fingerprint detector shown in FIG. 4.
Figure 6:
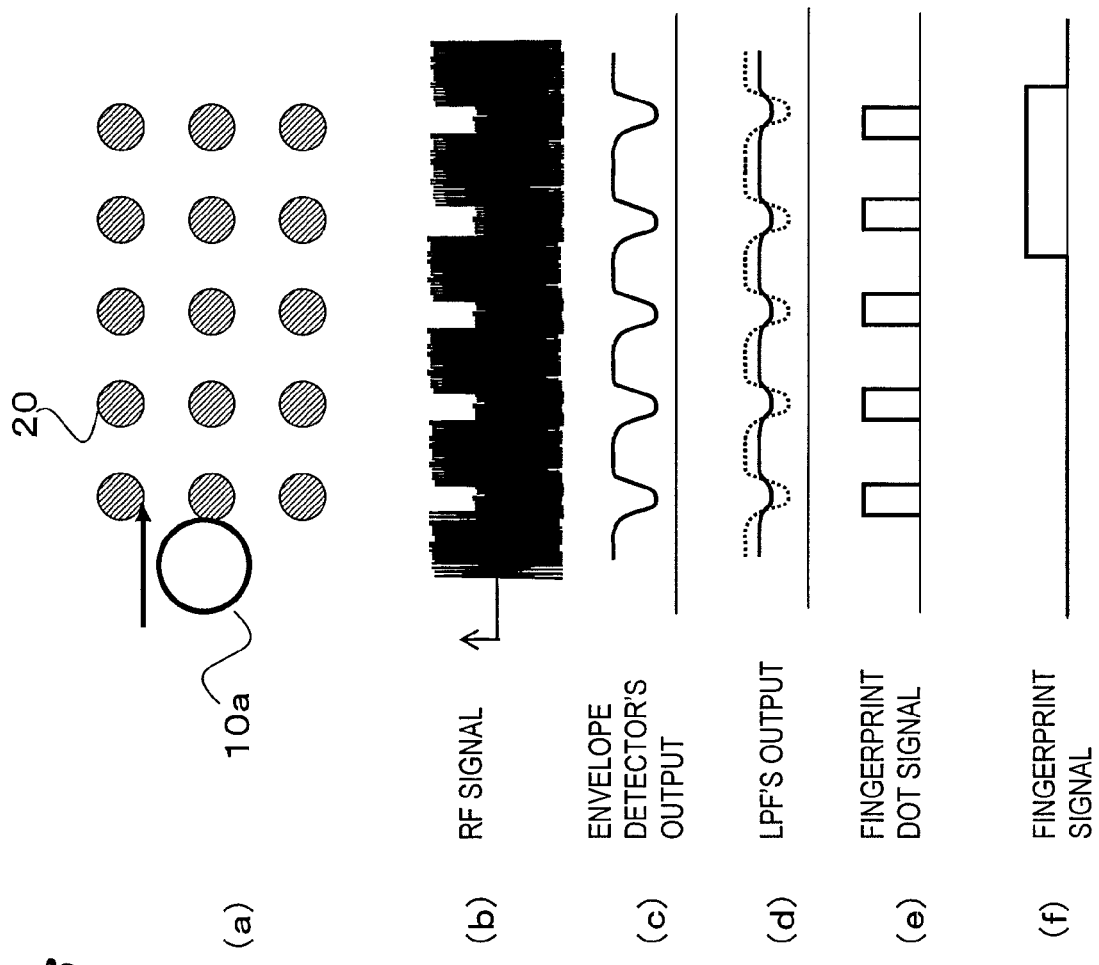

Portion (a) of FIG. 6 is a plan view schematically illustrating the location of a light beam spot with respect to fingerprint dots and portions (b) through (f) of FIG. 6 show the waveforms of respective signals to illustrate how the detector shown in FIG. 5 detects a fingerprint.

Figure 7:
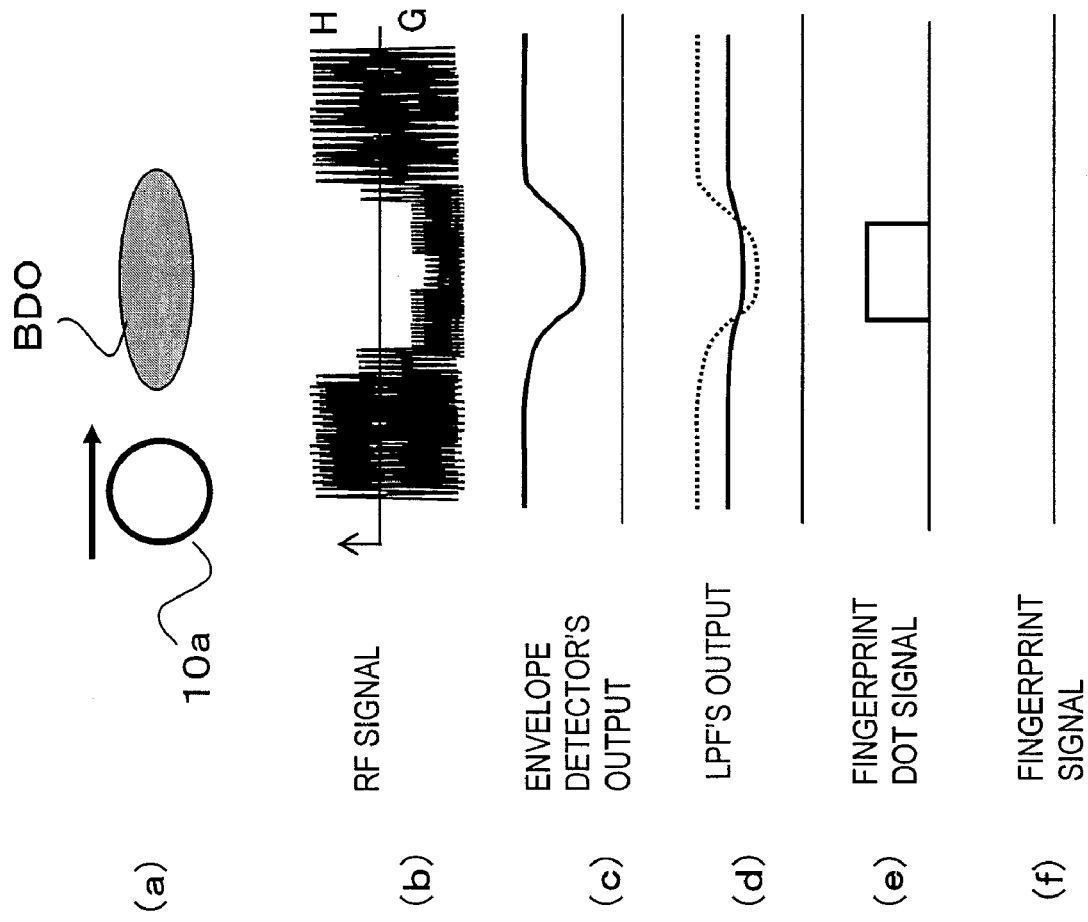

Portion (a) of FIG. 7 is a plan view schematically illustrating the location of a light beam spot with respect to a BDO area and portions (b) through (f) of FIG. 7 show the waveforms of respective signals to illustrate how the detector shown in FIG. 5 detects a fingerprint.

Figure 8:
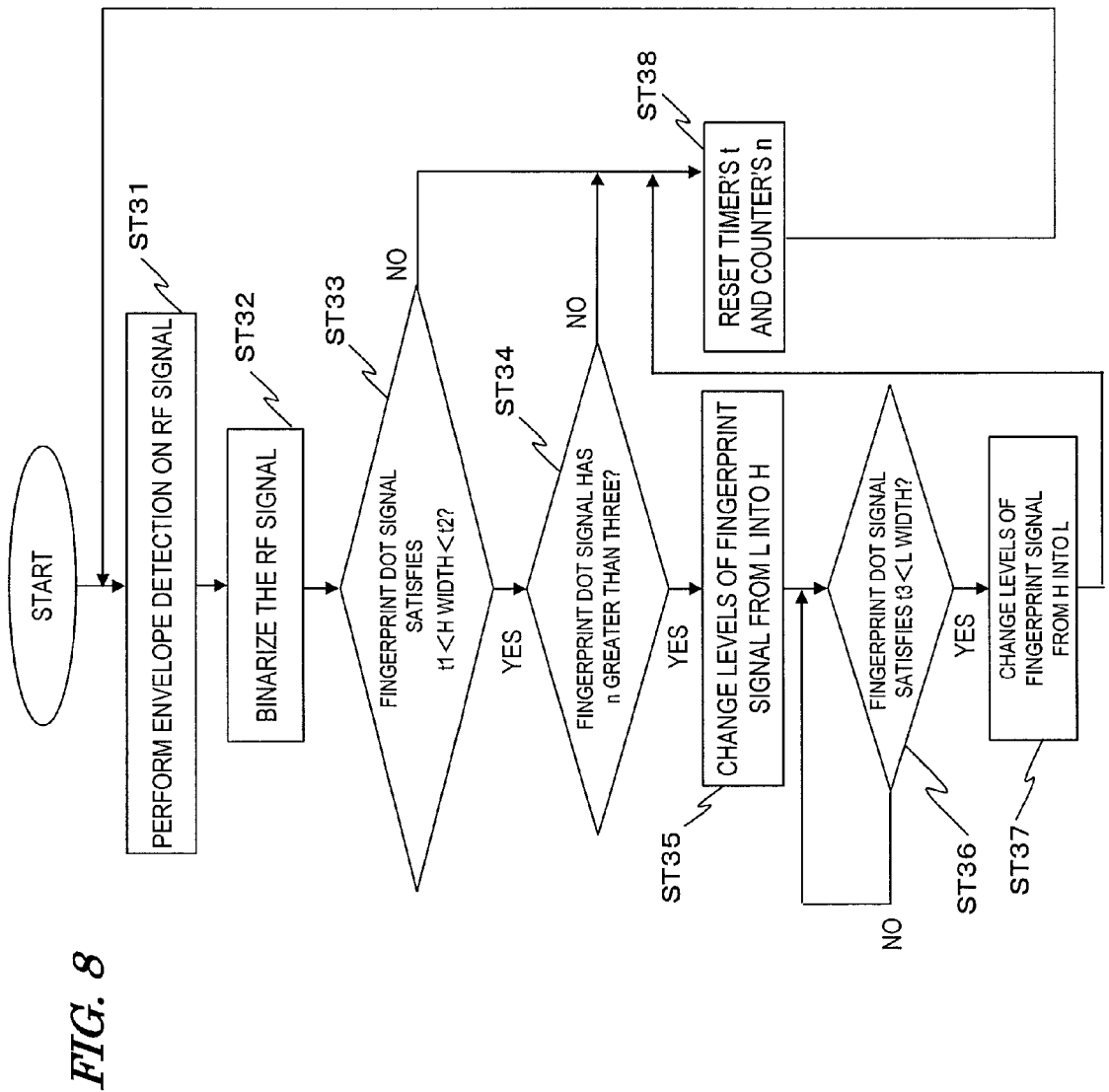

FIG. 8 is a flowchart showing the procedure in which the fingerprint detector shown in FIG. 5 detects a fingerprint.

Figure 9:
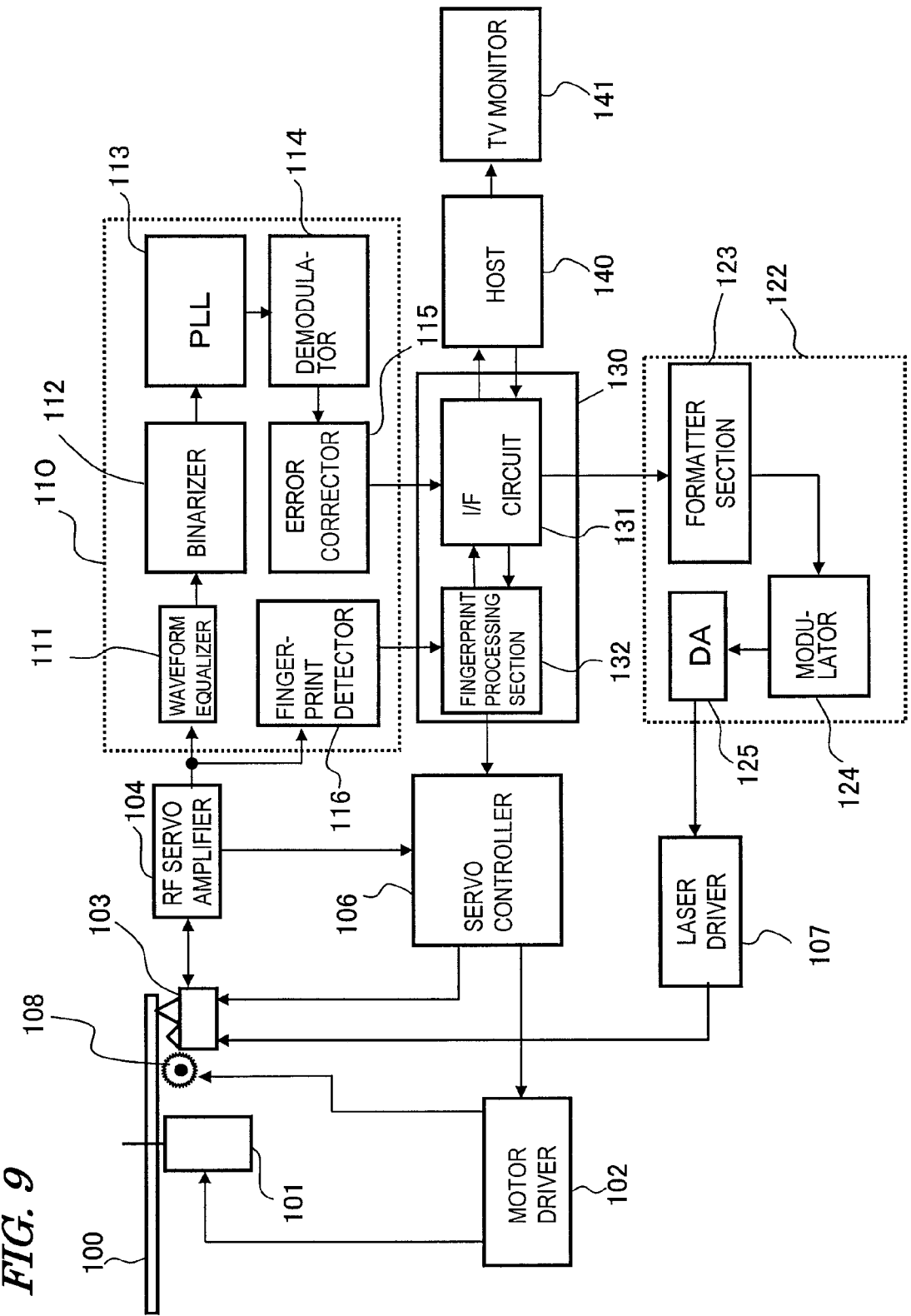

FIG. 9 shows the arrangement of functional blocks in an optical disc apparatus as another preferred embodiment of the present invention.

FIGS. 10A and 10B are respectively a plan view and a cross-sectional view illustrating the configuration of an optical pickup with a fingerprint wiping brush.

FIGS. 11A and 11B show how frequency characteristics change during cleaning and during a read/write operation while a focus control is ON.

Figure 12A:
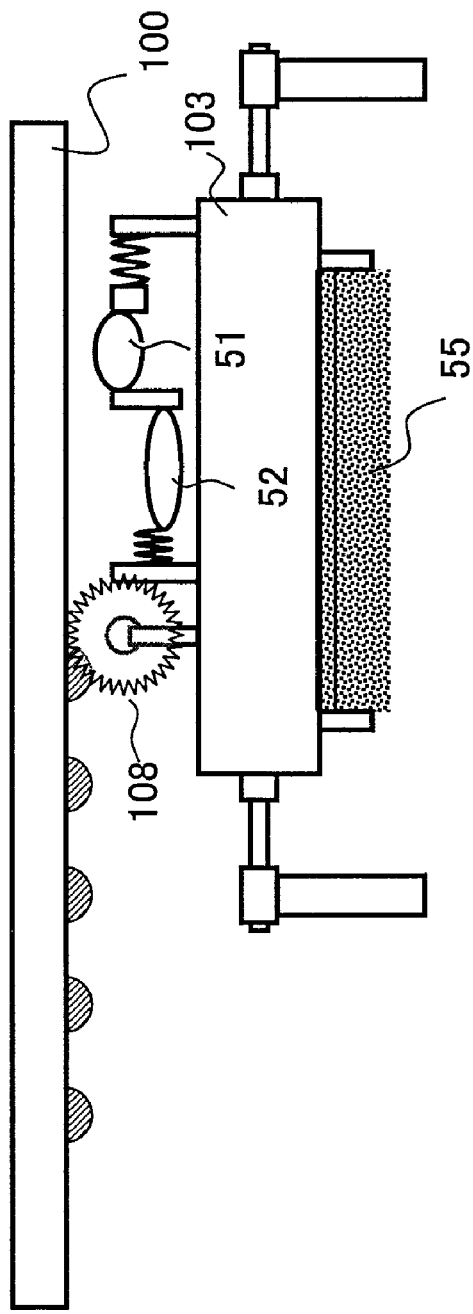
Figure 12B:
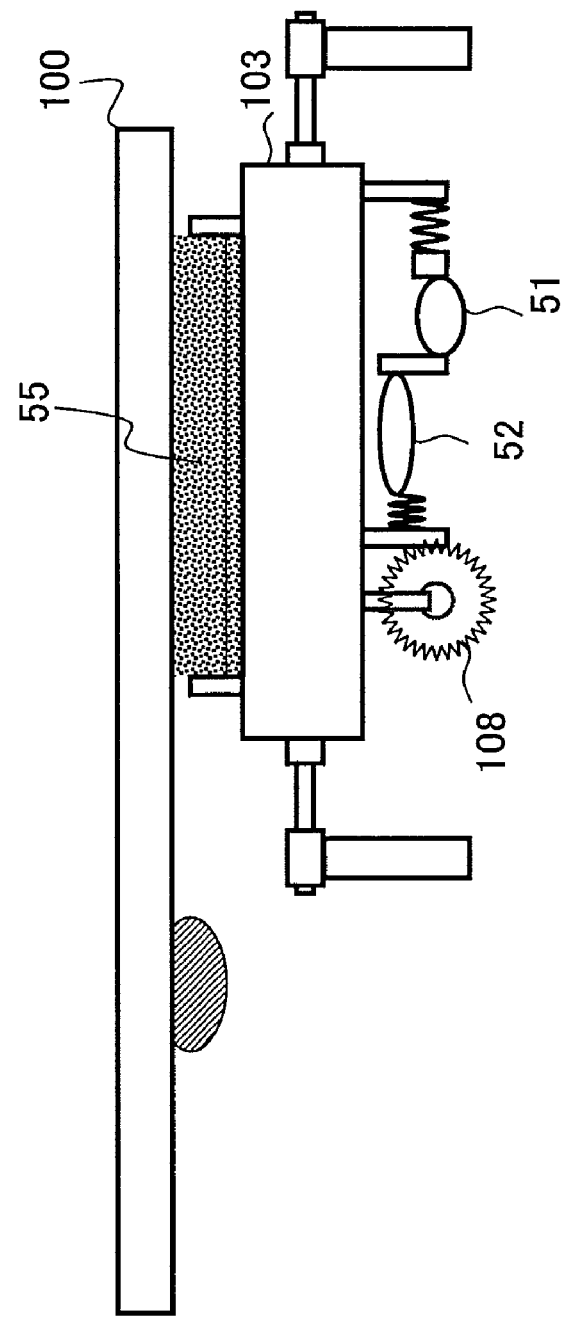

FIGS. 12A and 12B illustrate a main portion of an optical disc apparatus with a dust wiping brush and a fingerprint wiping brush.

Figure 13:
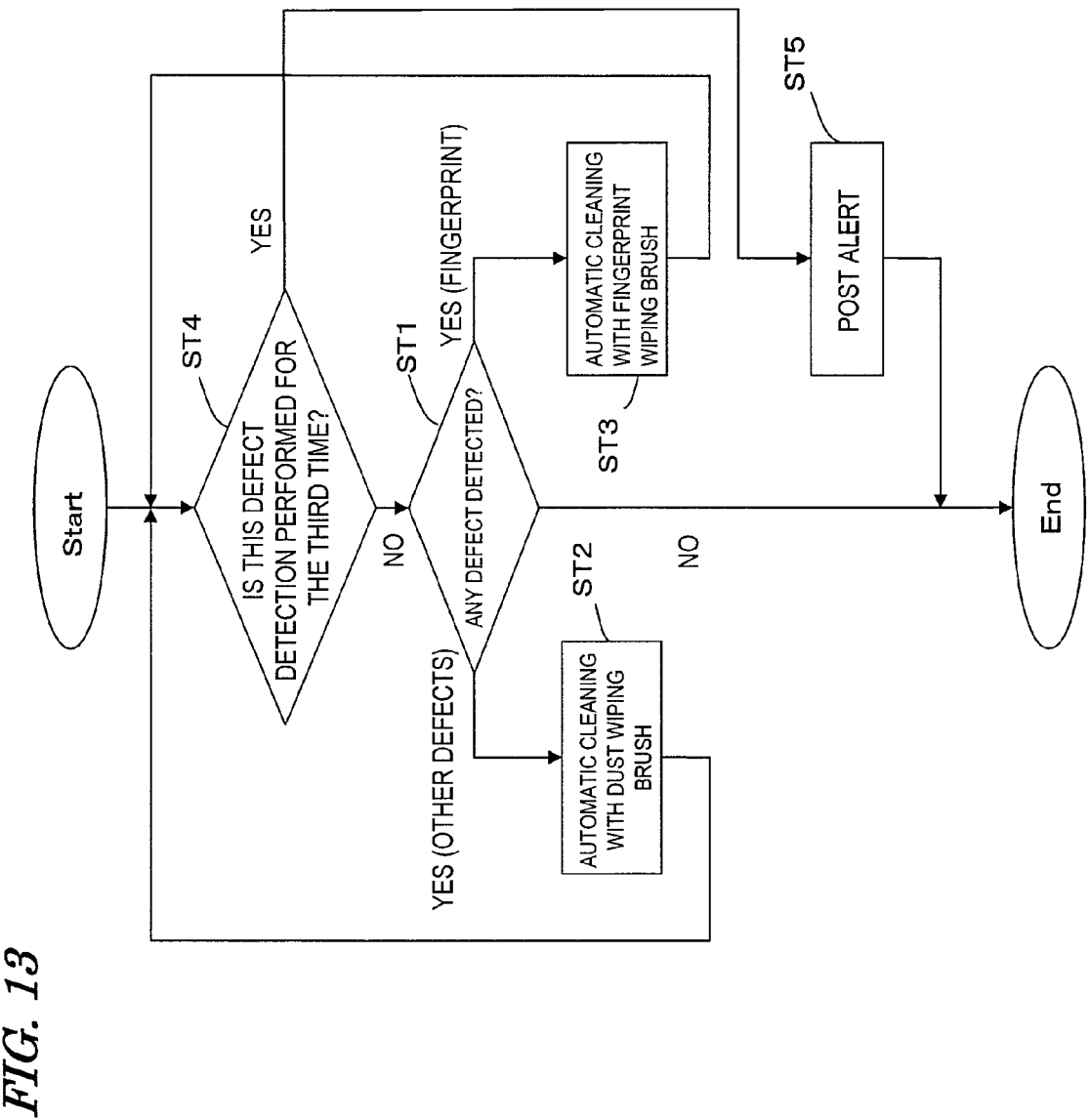

FIG. 13 is a flowchart showing how to remove defects from an optical disc using a fingerprint wiping brush and a dust wiping brush.

Figure 14:
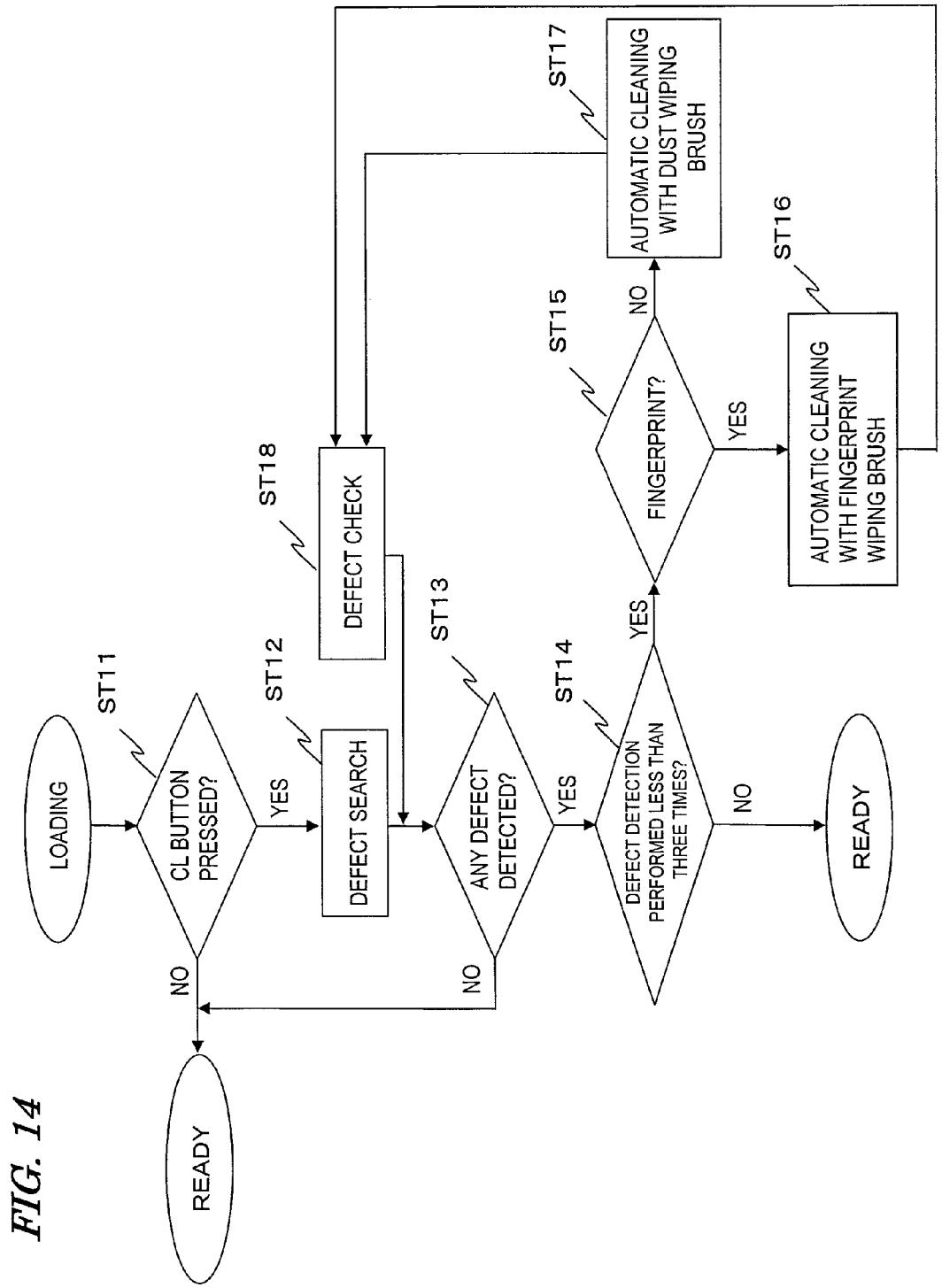

FIG. 14 is a flowchart showing an alternative fingerprint detection procedure.

Figure 15:
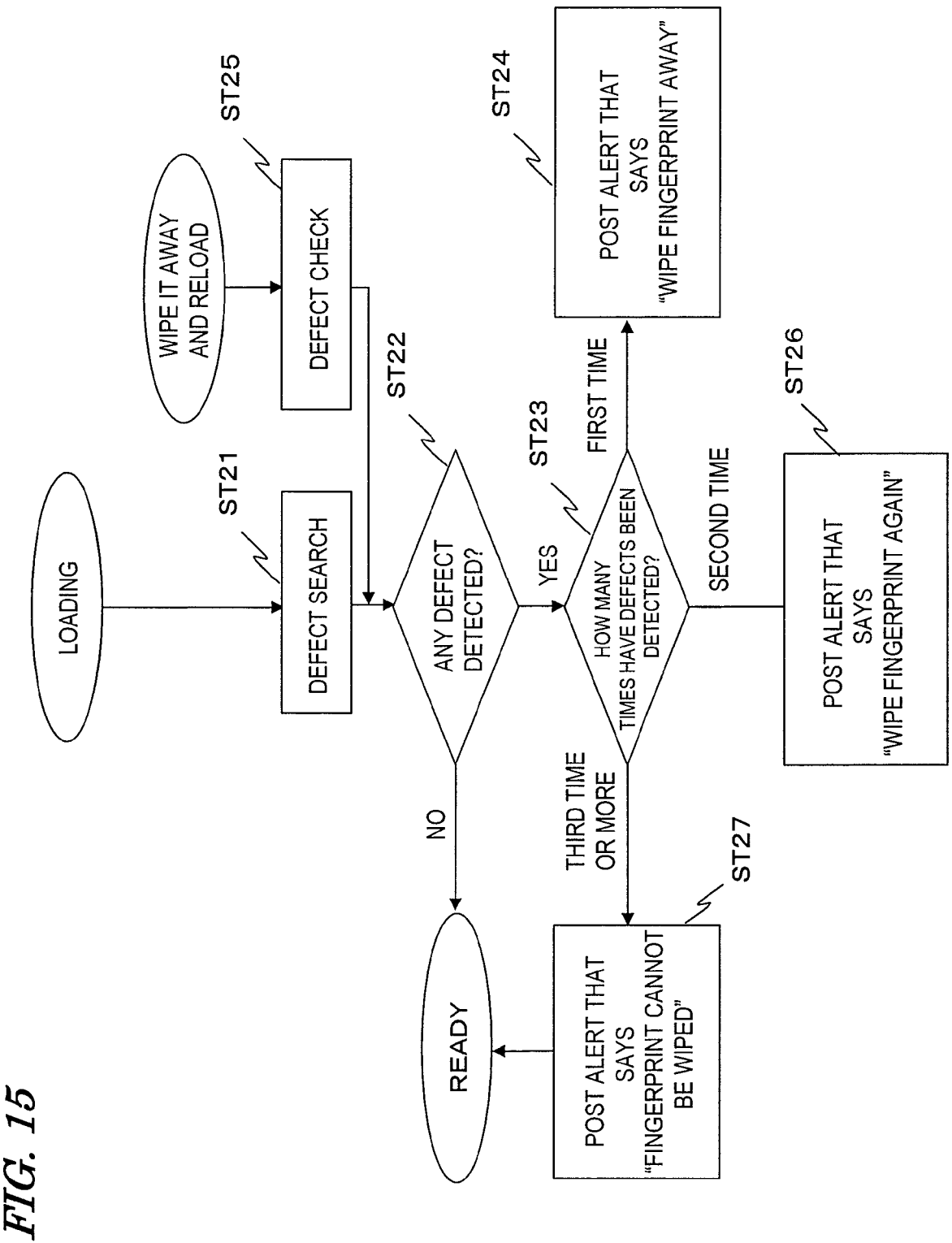

FIG. 15 is a flowchart showing another alternative fingerprint detection procedure.

DETAILED DESCRIPTION OF PREFERRED EMBODIMENTS

Since a BD requires a greater NA and a thinner light-transmitting layer (i.e., a coating layer), a BD is more sensitive to dust, dirt, and fingerprints, among other things, which have been deposited or left on the surface of the disc. Speaking of fingerprints, a fingerprint left on a DVD would just act as a single defect that would have only limited influence on the entire beam spot on the information layer, thus raising no big problems. In BDs, on the other hand, the beam spot on the information layer has so small a size that each of a great many dots that form the fingerprint would vary the amplitude of a light intensity signal (i.e., an RF amplitude) significantly. That is why in a BD, the signal quality is easily affected seriously by a fingerprint. Stated otherwise, however, an optical disc apparatus designed to process BDs can sense the presence of, and detect the location of, a fingerprint both easily and accurately based on the waveform of the RF amplitude.

Hereinafter, it will be described how in principle a fingerprint is detected according to the present invention.

Figure 1A:
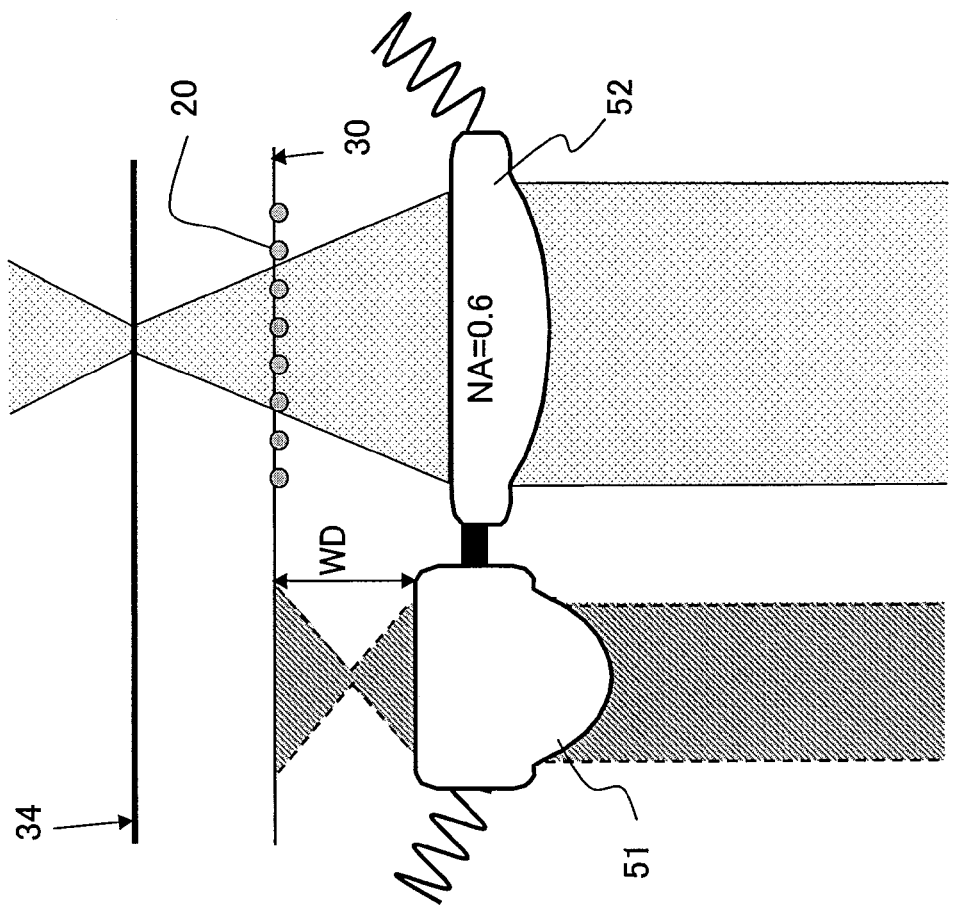
FIGS. 1A and 1B are schematic representations of an optical pickup illustrating a principle of fingerprint detection on a BD.
Figure 1B:
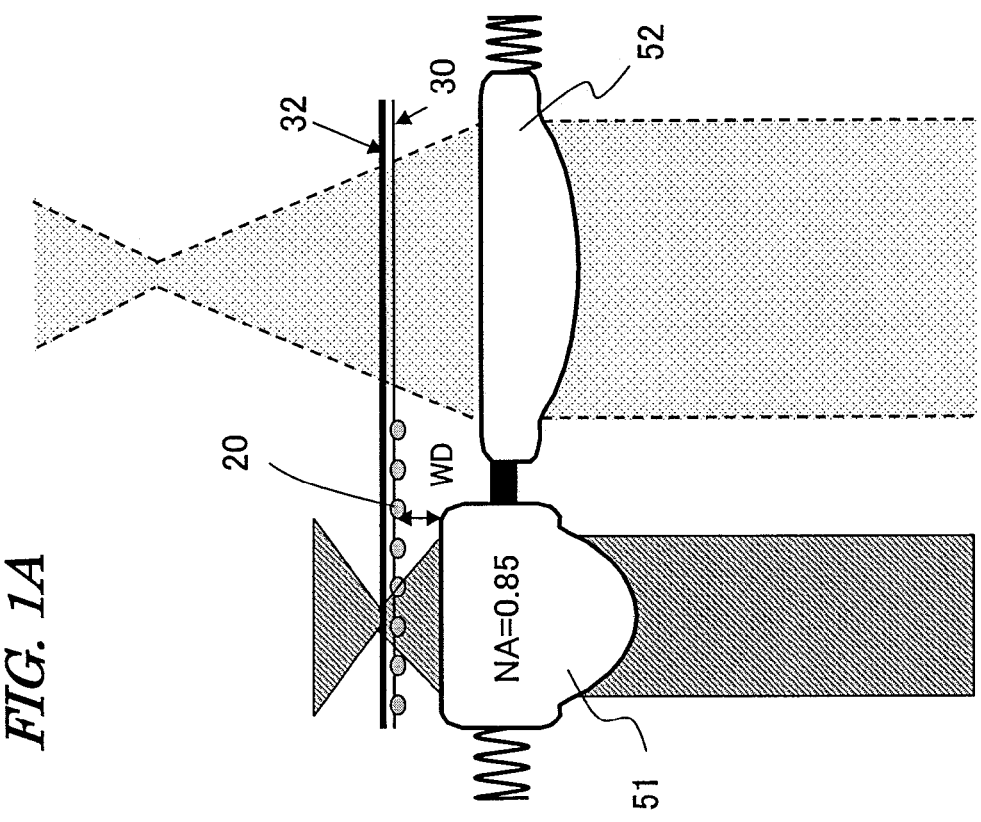

First, look at FIGS. 1A and 1B, which are cross-sectional views schematically illustrating how an optical pickup with a BD lens 51 and a DVD lens 52 focuses a light beam on information layers 32 and 34 of optical discs. Specifically, FIG. 1A illustrates how the BD lens 51 focuses the light beam on a BD's information layer 32, while FIG. 1B illustrates how the DVD lens 52 focuses the light beam on a DVD's information layer 34. In FIGS. 1A and 1B, WD stands for a working distance, which is the distance from the upper surface of the objective lens 51 or 52 to the surface 30 of the optical disc. In reading or writing data from/on the BD's information layer 32, the WD is adjusted to be approximately 0.3 mm. On the other hand, in reading or writing data from/on the DVD's information layer 34, the WD is adjusted to be approximately 1.0 mm. In the optical discs shown in FIGS. 1A and 1B, multiple fingerprint dots 20 are left on the surface 30 thereof.

As shown in FIGS. 1A and 1B, the light beam spot on the BD has been converged more narrowly than the one on the DVD. The diameter of the light beam spot on an information layer corresponds to a "limit of diffraction" to be determined by an NA and a wavelength. That is why the light beam spot on the DVD's information layer 34 has a diameter of approximately 0.9 µm to 1.0 µm, whereas the light beam spot on the BD's information layer 32 has a diameter of approximately 0.3 µm to 0.4 µm. The effective beam cross section on the BD is about a quarter to one fifth as large as that on the DVD.

Next, the spot diameter at the surface 30 of the BD is calculated. $NA = n \sin \theta$ is satisfied. That is why supposing $NA=0.85$ and the refractive index n of the coating layer is 1.5, then $0.85=1.5 \times \sin \theta$ is satisfied. Thus, the angle of incidence $\theta$ at the coating layer provided between the surface 30 of the disc and the information layer 32 becomes 34.5 degrees.

Since the coating layer has a thickness of 0.1 mm, the spot diameter D at the surface 30 of the BD is given by $D=2 \times 0.1 \times \tan(34.5)=0.137$ mm.

On the other hand, a DVD has an $NA=0.6$. That is why supposing the refractive index n of the coating layer provided between the surface 30 of the disc and the information layer 34 is 1.5, then $0.60=1.5 \times \sin \theta$ is satisfied. Thus, the angle of incidence $\theta$ becomes 23.6 degrees. Since the coating layer has a thickness of 0.6 mm, the spot diameter D at the surface 30 of the DVD is given by $D=2 \times 0.6 \times \tan(23.6)=0.524$ mm.

Therefore, since the spot diameters D at the surface 30 of the BD and DVD become approximately equal to 0.14 mm and 0.52 mm, respectively, the resolution of the BD becomes approximately four times as high as that of the DVD. The fingerprint dots 20 are made of sebum, for example, and have a height (or thickness) of approximately 100 µm and a refractive index of approximately 1.3 to 1.6. That is why where those fingerprint dots 20 are present at the surface 30 of the disc, the thickness of the coating layer substantially increases by the height of the fingerprint dots 20. As a result, when the incoming light beam passes through the dots 20, a spherical aberration is produced. For example, if the dots 20 are supposed to be detected by an increase or a decrease in the amplitude of an RF signal, a difference in signal level caused between the fingerprint dots 20 and a dot-to-dot gap expands as the spherical aberration varies. As a result, the fingerprint can be detected even more sensitively.

Figure 2:
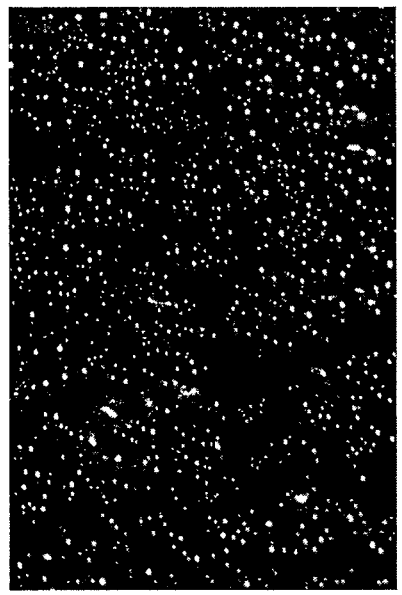
FIG. 2 is a micrograph of an actual fingerprint illustrating a principle of fingerprint detection on a BD.
Figure 3A:
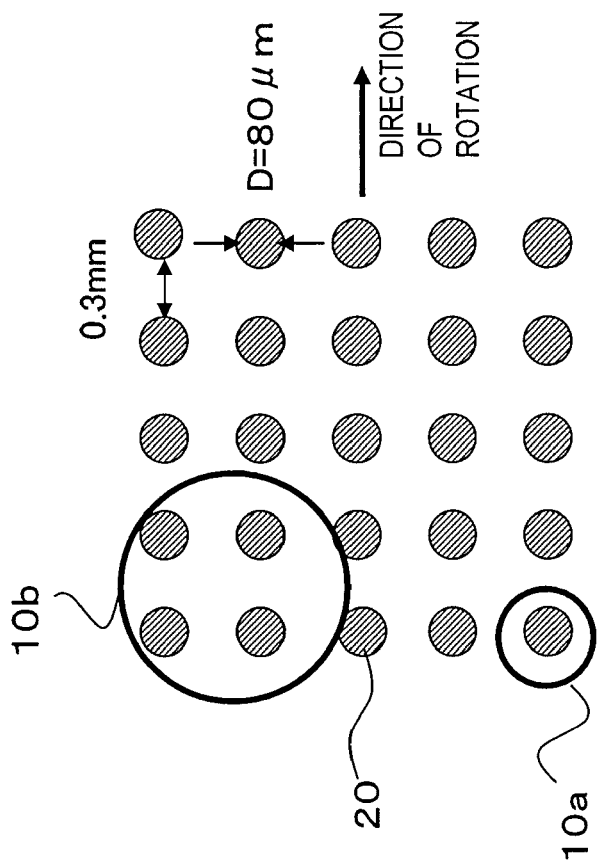
FIGS. 3A to 3C schematically show the locations of light beam spots with respect to fingerprint dots to illustrate a principle of fingerprint detection on a BD.
Figure 3B:
Figure 3C:
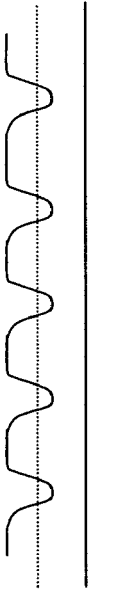

FIG. 2 is a micrograph of a fingerprint, in which the white dots represent fingerprint dots. Specific shape of a fingerprint varies between individuals according to their sex and age. In general, however, each dot 20 of a fingerprint normally has a diameter of approximately 80 µm or less and a dot-to-dot gap has a length of approximately 0.30 mm on average. As a result, the diameter of the spot 10a at the surface of the BD becomes smaller than the length of the dot-to-dot gap as shown in FIG. 3A, and therefore, the apparatus can sense the light beam spot pass one fingerprint dot 20 after another by an increase or a decrease in the amplitude of the RF signal as shown in FIG. 3C. Conversely, since the diameter of the spot 10b at the surface of the DVD becomes greater than the length of the dot-to-dot gap, the variation in the amplitude of the RF signal rather diminishes as shown in FIG. 3B even if the light beam spot passes one fingerprint dot 20 after another. Thus, it is difficult to detect the fingerprint dots 20 in that case.

The present inventors discovered that fingerprint dots at the surface of a disc could be detected with a light beam that had been converged narrowly by an optical system for BDs, thus perfecting our invention.

Figure 4:
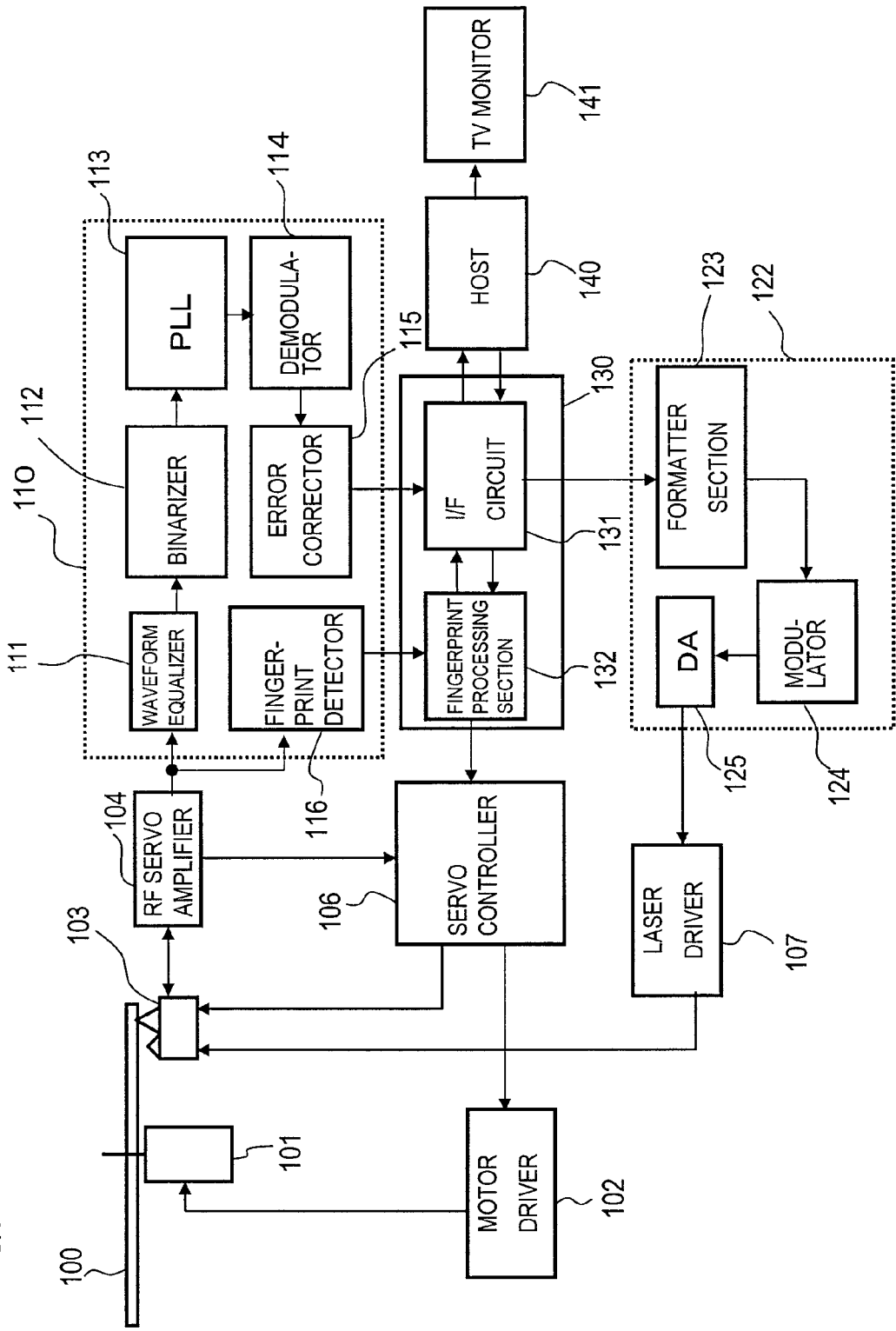
FIG. 4 shows the arrangement of functional blocks in an optical disc apparatus as a first preferred embodiment of the present invention.

Hereinafter, preferred embodiments of an optical disc apparatus according to the present invention, including a fingerprint detector, will be described. FIG. 4 is a block diagram illustrating a configuration for an optical disc apparatus as a preferred embodiment of the present invention. FIG. 5 shows the arrangement of functional blocks in the fingerprint detector of this preferred embodiment.

First of all, the basic configuration of an optical disc apparatus according to the present invention will be described with reference to FIG. 4.

The optical disc apparatus shown in FIG. 4 includes an optical pickup 103, which includes an optical system for converging a light beam on an optical disc, a photodetector for detecting the light reflected from the optical disc, and a laser diode (not shown) as a light source. The apparatus further includes a servo controller 106 for controlling the operation of the optical pickup 103, a read circuit 110 for performing read signal processing on an information signal that has been detected from the optical disc 100 by the optical pickup 103, and a write circuit 122 for writing information to store on the optical disc 100 by activating the laser diode by a predetermined modulating technique and making the laser diode generate a pulsed laser beam representing the information to be written and stored.

Specifically, the optical pickup 103 irradiates the optical disc 100, which has been mounted on an optical disc motor 101, with a converged laser beam. An RF servo amplifier 104 generates an electrical signal based on the light that has been reflected from the optical disc 100. The servo controller 106 performs a focus control and a tracking control on the optical disc 100 that has been mounted on the optical disc motor 101.

In the read circuit 110, a waveform equalizer 111 equalizes the electrical signal supplied from the RF servo amplifier 104, thereby generating an analog read signal, which is then binarized by a binarizer 112. The binary signal thus obtained is synchronized with a read clock signal (functioning as a reference clock signal) by a PLL circuit 113, thereby extracting data. Thereafter, a demodulator 114 and an error corrector 115 make an error correction on every predetermined number of blocks of that data. Then, the signal thus obtained is output from the read circuit 110 to a system controller 130, which includes an I/F circuit 131 and a fingerprint processing section 132. The signal that has been entered into the system controller 130 from the read circuit 110 is also transferred to a host 140 by way of the I/F circuit 131.

The write circuit 122 includes a formatter section 123 that adds a header and redundancy bits for the purpose of error correction, a modulator 124 for modulating the signal into a predetermined modulation pattern (or by a predetermined modulating method), and a D/A converter 125 for converting the digital signal into an analog signal to be input to a laser driver 107. To write the information that has been provided from the host 140 by way of the I/F circuit 131 on the optical disc 100, the read circuit 122 activates the laser diode (not shown) in the optical pickup 103 and makes it produce a pulsed laser beam. As the laser beam impinging on the optical disc 100 varies its intensities, the reflectances of the recording material (such as an organic material or a phase change material) of the optical disc 100 are changed, thereby writing information as ones or zeros.

When the light beam passes through a fingerprint on the optical disc 100, the amplitude of the output signal of the RF servo amplifier 104 changes significantly depending on whether the light beam is passing through the fingerprint dots themselves or the gap between those dots. The fingerprint detector 116 monitors that change of the amplitudes, thereby determining whether or not there is a fingerprint on the optical disc 100. A fingerprint signal thus generated by the fingerprint detector 116 is input to the fingerprint processing section 132 in the system controller 130.

Look at FIG. 5 next. The RF signal supplied from the RF servo amplifier 104 shown in FIG. 4 is input to an LPF 1230 and an envelope detector 1220 in the fingerprint detector 116 shown in FIG. 5. The outputs of the envelope detector 1220 and the LPF 1230 are both entered into a binarizer 1240, which slices off the output signal of the envelope detector 1220 with the level of the output signal of the LPF 1230 defined as a reference level for binarization (i.e., as a slice level). As a result, a binarized signal that makes transitions between High level (of a pulse) representing fingerprint dots and Low level representing the dot-to-dot gap (which will be referred to herein as a "fingerprint dot signal") is generated.

The fingerprint dot signal has its waveform shaped by a waveform shaping section 1250 and then is input to a fingerprint measuring section 1200. The fingerprint dot signal has a pulse train representing the respective dots that form the fingerprint. That is why by measuring the pulse widths and pulse intervals, the fingerprint can be distinguished from the other types of defects. In the fingerprint measuring section 1200, a timer 1202 measures the widths of the respective pulses (at High level) included in the fingerprint dot signal and the intervals (at Low level) between those pulses. If the measured values fall within the range of predetermined pulse widths representing fingerprint dots and within the range of predetermined intervals representing dot-to-dot gaps, the number of the fingerprint dots is stored in a counter buffer 1201. If the light beam is going to pass through a number of fingerprint dots, the number of dots is incremented by one every time the light beam passes through one of the fingerprint dots. That is why if the defect that the light beam is now passing is a fingerprint, at least a predetermined number of dots are detected continuously. The count (i.e., the output signal) of the counter buffer 1201 is compared to a predetermined value by a comparator 1204. If the count of the counter buffer 1201 is equal to or greater than the predetermined value, a gate circuit 1203 is notified of the result of the comparison made by the comparator 1204. Based on the output of the comparator 1204, the gate circuit 1203 generates a signal indicating whether the defect detected is a fingerprint or not (which will be referred to herein as a "fingerprint signal"). Then, the fingerprint signal is fed back from the gate circuit 1203 to a control section 1210. In response to this feedback, the timer 1202 and the counter buffer 1201 are reset. Also, while getting ready to enter the next fingerprint detecting state, the fingerprint detector 116 outputs the fingerprint signal to the fingerprint processing section 132 in the system controller 130 shown in FIG. 4.

A steep drop of the amplitude of an RF signal due to presence of dust or a scratch is called "black dropout (BDO)". Thus, defects caused by dust or a scratch (i.e., defects other than fingerprints) will sometimes be referred to herein as "BDO", too. If the light beam passes an area that would produce a BDO (which will be referred to herein as a "BDO area"), then the binarizer 1240 outputs only a single-pulse signal with a long pulse width. As a result, the gate is kept "L" due to the restriction on the width represented by a timer value and on the count of the counter buffer. Since the control section 1210 presets the timer 1202 and the counter buffer 1201 in such a state, no fingerprint signal is output if the light beam has passed the BDO area.

Next, it will be described with reference to FIGS. 6 to 8 how signal waveforms change due to a defect.

FIGS. 6 and 7 are timing diagrams showing how the signals of respective components of the fingerprint detector change their waveforms in a situation where a light beam to read and write from/to a BD passes a fingerprint and a BDO area. More specifically, portion (a) of FIG. 6 is a plan view schematically illustrating a light beam spot 10a and fingerprint dots 20. Portion (b) of FIG. 6 shows the waveform of the output of the RF servo amplifier 104 (i.e., an RF signal) when the light beam spot 10a passes the fingerprint dots 20. Portion (c) of FIG. 6 shows the output of the envelope detector 1220. Portion (d) of FIG. 6 shows the output of the LPF 1230. Portion (e) of FIG. 6 shows the waveform of the signal that has been binarized and has its waveform shaped by the binarizer 1240 (i.e., the fingerprint dot signal). And portion (f) of FIG. 6 shows the waveform of the fingerprint signal that is the output of the gate circuit 1203.

On the other hand, portion (a) of FIG. 7 is a plan view schematically illustrating a light beam spot 10a and a BDO area. Portion (b) of FIG. 7 shows the waveform of the output of the RF servo amplifier 104 (i.e., an RF signal) when the light beam spot 10a passes the BDO area. Portion (c) of FIG.

7 shows the output of the envelope detector 1220. Portion (d) of FIG. 7 shows the output of the LPF 1230. Portion (e) of FIG. 7 shows the waveform of the signal that has been binarized and has its waveform shaped by the binarizer 1240 (i.e., the fingerprint dot signal). And portion (f) of FIG. 7 shows the waveform of the fingerprint signal that is the output of the gate circuit 1203.

FIG. 8 is a flowchart showing the flow of fingerprint detection processing.

As described above, the diameter of the light beam spot 10*a* on a BD is approximately one fifth to a quarter as large as that of the light beam spot 10*b* on a DVD, and is close to the sizes of the fingerprint dots 20 or the dot-to-dot gap. That is why when the light beam spot 10*a* passes a fingerprint, the amplitude of the RF signal representing the reflected light varies as shown in portion (b) of FIG. 6. The amplitude of the RF signal decreases because the intensity of the reflected light decreases when the light beam spot 10*a* passes each of the fingerprint dots that form the fingerprint. On the other hand, if the light beam spot 10*b* has a large diameter as in a DVD (see FIG. 3), multiple fingerprint dots are always included in the single light beam spot 10*b*. That is why the decrease in the amplitude of the RF signal in response to the passage of the light beam spot through each fingerprint dot as shown in portion (b) of FIG. 6 cannot be detected from a DVD.

Portion (d) of FIG. 6 shows how the signal shown in portion (b) of FIG. 6 changes its waveforms when output from the LPF 1230. If the output of the envelope detector 1220 shown in portion (c) of FIG. 6 is binarized by comparing its levels to the reference detection level that is defined by this LPF output, a fingerprint dot signal having a waveform representing the fingerprint dots can be obtained as shown in portion (e) of FIG. 6. If the timer 1202 has found the fingerprint dot signal have a predetermined pulse width (which will be referred to herein as "H width") and a predetermined pulse interval (which will be referred to herein as "L width"), then the fingerprint dot signal is stored in the counter buffer 1201. If the comparator 1204 has found the pulse widths of the fingerprint dot signal equal to or greater than a predetermined value a prescribed number of times (e.g., three times) consecutively, then the gate circuit 1203 generates and outputs a fingerprint signal as shown in portion (f) of FIG. 6. Also, if the timer 1202 has found the interval between the pulses of the fingerprint dot signal (i.e., the "L width") greater than t3, then the fingerprint signal is changed from H level into L level.

On the other hand, since a BDO area is bigger than a fingerprint dot, the amplitude of the RF signal continues to drop for a relatively long time as shown in portion (b) of FIG. 7. When such an RF signal is passed through the LPF 1230, the LPF output shown in portion (d) of FIG. 7 is obtained.

If the output of the envelope detector shown in portion (c) of FIG. 7 is binarized by the binarizer 1240, then a fingerprint dot signal, having a waveform representing the magnitude of the BDO, can be obtained as shown in portion (e) of FIG. 7. The pulse width (i.e., "H width") of this fingerprint dot signal is measured by the timer 1202. In this case, since the pulse width fails to satisfy t1<H width<t2, the count of the counter buffer 1201 is not incremented. As a result, no fingerprint signal is output in this case as shown in portion (f) of FIG. 7.

Hereinafter, an exemplary fingerprint detection flow will be described with reference to FIG. 8.

First, in Step ST31, envelope detection is performed on an RF signal. Next, in Step ST32, the RF signal is binarized, thereby generating a fingerprint dot signal.

Subsequently, in Step ST33, it is determined whether or not the width (H width) of pulses included in the fingerprint dot signal falls within a predetermined range. If the answer is NO, it is determined that the defect is not a fingerprint and the process advances to Step ST38, in which the timer and the counter are reset to get ready for the next defect detection.

If it is determined in Step ST33 that the pulse widths (H widths) do fall within the predetermined range, then it is determined in the next step ST34 whether or not the number n of pulses that form the pulse train representing fingerprint dots is more than three. If the answer is NO, then it is determined that the defect is not a fingerprint and the process advances to Step ST38. On the other hand, if n is greater than three, then the defect is regarded as a fingerprint and the process advances to Step ST35, in which the levels of the fingerprint signal are changed from L into H.

Next, in Step ST36, it is determined whether or not the pulse-to-pulse interval of the fingerprint dot signal is longer than a predetermined period t3. If the answer is NO, then it is determined that the light beam is now passing a fingerprint and the level of the fingerprint signal is kept "H".

On the other hand, if the answer to the query of step ST36 is YES, then it is determined that the light beam has already passed the fingerprint, the level of the fingerprint signal is decreased to "L" in Step ST37 and then the process advances to Step S38.

The fingerprint detector 116 and the fingerprint processing section 132 described above define fingerprint detecting means that can determine the size and location of a fingerprint. Thus, according to the present invention, the optical disc apparatus may be designed to perform various types of processing in order to either notify the user of the presence and location of a fingerprint or wipe the fingerprint by itself.

Hereinafter, specific preferred embodiments of an optical disc apparatus that performs various types of processing on detecting a fingerprint will be described. An optical disc apparatus of any of the preferred embodiments of the present invention to be described below has the configurations shown in FIGS. 4 and 5 and can detect a fingerprint on the optical disc.

EMBODIMENT 1

A first specific preferred embodiment of an optical disc apparatus according to the present invention will be described. The optical disc apparatus as the first preferred embodiment of the present invention basically has the same configuration as the one shown in FIGS. 4 and 5 and can detect a fingerprint left on the optical disc. And the optical disc apparatus of this preferred embodiment has the function of notifying the user of the presence of a fingerprint on detecting one on the optical disc.

As described above, the fingerprint signal indicating whether or not a fingerprint has been detected is output from the fingerprint detector 116 shown in FIG. 4 to the fingerprint processing section 132 in the system controller 130. By reference to an address signal that has been provided by the demodulator 114 in the read circuit 110 by way of the error corrector 115, the fingerprint processing section 132 can find the start and end addresses of the fingerprint signal. And based on these addresses, the fingerprint processing section 132 can determine the size and location (i.e., the radial location on the optical disc) of the fingerprint that the light beam has passed.

Once the size and location of the fingerprint have been determined, the information about the size and location of the fingerprint is conveyed to the host 140 by way of the I/F circuit 131. If the optical disc apparatus is a recorder or a player, the host 140 is a so-called "backend". On the other hand, if the optical disc apparatus is an optical disc drive, the host 140 is a personal computer (PC) connected to a drive with an ATAPI (AT attachment packet interface), for example.

On getting the information about the size and location of the fingerprint, the host 140 may put, on a TV monitor 141 connected to a PC, the alert that reads:

"A fingerprint with φ of 10 mm is left at a radial location of 35-40 mm on optical disc. As read/write operation may fail, please wipe it away or replace the discs"

Optionally, the host 140 may be a control unit that is built in an optical disc apparatus. In that case, the host 40 may display an error code, corresponding to the alert, on the display area of the front panel of the optical disc apparatus. Alternatively, as soon as a fingerprint is detected, the host 140 may put out such an alert as a voice message to the user.

On receiving such a notification, the user can know how big the fingerprint on the optical disc is and where the fingerprint is located on the disc. Thus, the user can remove the fingerprint away appropriately by cleaning the designated portion of the disc with a fingerprint cleaner, for example, by himself or herself.

EMBODIMENT 2

The optical disc apparatus of the first preferred embodiment described above notifies the user of the detection of a fingerprint by putting out an alert as either a text message or a voice message, thereby prompting him or her to replace the optical discs or clean the disc in question right away. However, such a notification is useless in a situation where a scheduled recording operation is performed while the user is away from home or after he or she has gone to bed. Thus, in order to cope with such a situation, on detecting a fingerprint, the optical disc apparatus of this preferred embodiment cleans the disc automatically with a wiping brush.

As described above, by using a fingerprint detector such as the one shown in FIG. 5, it can be determined whether a defect on the optical disc is a fingerprint or not, and if the defect turns out to be a fingerprint, the size of that fingerprint and its radial location on the optical disc can also be determined. That is why if the optical disc apparatus is equipped with a cleaner (such as a wiping brush) as in this preferred embodiment, the cleaner can be positioned almost perfectly with respect to the fingerprint on the optical disc. As a result, a portion of the optical disc with the fingerprint can be automatically cleaned selectively. According to this preferred embodiment, the fingerprint can be wiped away in a shorter time because the cleaning is never performed in vain on portions of the optical disc that are not spotted with fingerprints.

FIG. 9 illustrates a basic configuration for an optical disc apparatus as a second preferred embodiment of the present invention. The optical disc apparatus of this preferred embodiment includes a wiping brush 108 as a cleaner. More specifically, the wiping brush 108 is provided for the optical pickup 103 and has its operation controlled by the motor driver 102. Also, the wiping brush 108 is usually retracted so as to avoid contact with the optical disc 100 but sticks out toward the optical disc 100 only while cleaning the disc 100 and wiping the fingerprint away. And when the cleaning is over by wiping the fingerprint away, the wiping brush 108 is either shifted back to or retracted in its rest position. In the other respects, the optical disc apparatus of this preferred embodiment has the same configuration as the counterpart shown in FIG. 4, and the description of the other components used in common in these two preferred embodiments will be omitted herein.

FIG. 10A is a plan view illustrating the position of the optical pickup 103 with the fingerprint wiping brush 108 with respect to a fingerprint on an optical disc. FIG. 10B is a cross-sectional view schematically illustrating an exemplary configuration of the optical pickup 103.

In the optical pickup 103 of this preferred embodiment shown in FIG. 10A, a BD lens 51 and a DVD lens 52 are arranged in this order such that the BD lens 51 is located ahead of the DVD lens 52 in the direction in which the optical disc rotates as indicated by the arrow. The wiping brush 108 is arranged on the other side of the DVD lens 52 opposite to the BD lens 51. That is to say, the fingerprint wiping brush 108 faces the same track (not shown) on the optical disc as the one that the BD lens 51 or the DVD lens 52 faces. It should be noted that the respective tracks on the optical disc run parallel to each other in the direction in which the disc rotates in the vicinity of the optical pickup 103. In this preferred embodiment, the fingerprint wiping brush 108 is arranged near the BD lens 51 for use to detect a fingerprint. That is why just by performing a seek operation toward the location specified by the address of the fingerprint detected, the wiping brush 108 can be positioned easily.

Optionally, the size, shape and material of the wiping brush (or cleaner) 108 may be designed and determined just for the purpose of wiping away nothing but a fingerprint properly. To wipe a fingerprint away, at least a predetermined stress is required. That is why it is effective to form the brush 108 in a roller shape and use a viscous material to make the brush 108 as shown in FIG. 10B. Alternatively, the tips of the brush may be rounded or a few pieces of relatively thick cloth may be stacked one upon the other.

The wiping operation is preferably performed for a predetermined amount of time or a predetermined number of times (i.e., with the disc rotated the predetermined number of times) with the focus control suspended once and with the cleaner 108 brought into contact with the optical disc 100. And when the predetermined amount of time passes, the focus control on the same location is turned ON again and that location is retraced until the sudden steep drop of the RF signal level due to the presence of a fingerprint no longer occurs (i.e., until no signal representing a fingerprint is detected anymore). When it is confirmed that the fingerprint has been wiped away successfully, the cleaner is shifted to the next radial location where another fingerprint has been detected. In this manner, the fingerprints can be removed just as intended and the reliability of the read/write operations can be increased significantly.

Alternatively, the optical disc apparatus may be designed so as to clean the optical disc 100 with the focus servo ON by arranging the cleaner 108 at the front end of the optical pickup 103 in its traveling direction with respect to the optical disc 100. In that case, no sooner has the optical disc 100 been cleaned a predetermined number of times of rotation than it can be determined, by the level of a fingerprint signal obtained from the RF signal, whether the fingerprint has been wiped away or not.

If the optical disc 100 is cleaned with the focus servo ON in this manner, the vibrations of the cleaner will be transmitted to the optical disc 100 due to the contact between the cleaner and the disc, thus causing some disturbance on the focus servo operation. However, since no data should be read or written while the fingerprint is being wiped, the focus servo performance (such as the gain) may just be switched into a less sensitive one during the cleaning than during a read/write operation.

For example, if a good phase margin is left, the focus servo failure will rarely occur. In that case, the apparatus will exhibit good responsivity to a disturbance but there will be much steady-state deviation. Even so, as no data is read or written during cleaning, the increase in the steady-state deviation will not be an issue. FIGS. 11A and 11B shows the frequency characteristics of the focus filter during cleaning and during a read/write operation. During the cleaning, the phase margin is increased by decreasing the gains compared to the ones during the read/write operation.

Anyway, by arranging the BD lens 51 and the wiping brush 108 together on the base of the optical pickup 103 as described above, automatic cleaning can be done at a reduced cost by integrating those members together with the base and without interfering with the size reduction of the apparatus.

Hereinafter, it will be described with reference to FIG. 9 in what procedure the cleaner wipes the fingerprint away.

Specifically, if a fingerprint has been detected on the optical disc 100, the fingerprint processing section 132 of the system controller 130 shown in FIG. 9 outputs a signal to the optical pickup 103 and the motor driver 102 by way of the servo controller 106.

By reference to the address signal that has been provided by the demodulator 114 in the read circuit 110 by way of the error corrector 115, the fingerprint processing section 132 can find the start and end addresses of the fingerprint signal. As a result, the fingerprint processing section 132 can determine the size and the radial location of the fingerprint that the light beam has passed. Once the size and location of the fingerprint have been determined, the fingerprint processing section 132 provides the information about the fingerprint (which will be referred to herein as "fingerprint information") for the servo controller 106. On receiving the fingerprint information, the servo controller 106 moves the optical pickup 103 and a traverse motor (not shown) that drives the optical pickup 103 in the radial direction, thereby bringing the wiping brush 108 on the optical pickup 103 into contact with the optical disc at the radial location where the fingerprint has been detected. Thereafter, the servo controller 106 gets the wiping brush 108 turned reversely to the direction of rotation of the optical disc 100 by the motor driver 102, thereby wiping away the fingerprint that has been left on the surface of the optical disc 100.

Even without turning the wiping brush 108 reversely, the fingerprint can also be wiped away just by getting the optical disc 100 rotated by the optical disc motor 101 and letting the wiping brush 108 stick out and contact with the optical disc 100. In that case, the optical disc 100 preferably continues being rotated while keeping contact with the wiping brush 108 for a longer time compared to the situation where the fingerprint is wiped away by turning the wiping brush 108 reversely. Even so, since it is already known exactly where on the optical disc 100 the fingerprint is located, the fingerprint can be wiped away much more quickly compared to a situation where the optical disc 100 needs to be cleaned entirely.

As described above, a conventional optical disc apparatus cannot determine whether a defect detected on an optical disc is a fingerprint or something else such as a scratch or dust. That is why it has been proposed that if any defect has been found on an optical disc, the optical disc be cleaned entirely to remove the dust, if any, from the optical disc. In that case, however, the material and shape of the cleaner or brush should be determined so as to remove dust properly. Thus, it is difficult to remove a fingerprint sufficiently with such a cleaner or brush. Consequently, the conventional automatic cleaning technique cannot guarantee that a fingerprint can be removed properly.

However, according to the present invention, a fingerprint located and any other defect detected such as dust and scratches can be clearly distinguished from each other. That is why by providing a cleaner or brush, which is specially designed so as to remove a fingerprint perfectly, for the optical disc apparatus, a fingerprint, if detected any, can be removed by a proper cleaning. In addition, according to this preferred embodiment, the fingerprint can be located exactly and it can be determined whether or not the fingerprint has been removed perfectly. That is why only a portion of the disc spotted with a fingerprint can be wiped with a specially designed fingerprint cleaner over and over again until the fingerprint disappears completely. As a result, the fingerprint can be removed quickly.

EMBODIMENT 3

An optical disc apparatus as a third preferred embodiment of the present invention includes not only the fingerprint wiping brush 108 described above but also a dust wiping brush as well.

FIG. 12 illustrates an exemplary configuration for an optical pickup with two types of brushes.

Specifically, the optical pickup 103 shown in FIG. 12 includes not only the fingerprint wiping brush 108 on the same side as the lenses but also a dust wiping brush 55 on the opposite side to the lenses. This optical pickup 103 can be turned by a motor (not shown). FIG. 12A illustrates how the fingerprint wiping brush 108 is cleaning the optical disc 100. On the other hand, in the state shown in FIG. 12B, the reverse side of the optical pickup 103 now faces the optical disc 100 by turning the optical pickup 103 in the state shown in FIG. 12A 180 degrees around its shaft. If the optical pickup 103 takes this position, the optical disc 100 can be cleaned with the dust wiping brush 55.

It should be noted that the fingerprint wiping brush 108 and the dust wiping brush 55 do not have to be provided for the optical pickup 103 but could be arranged in any other part of the optical disc apparatus.

By using both of these brushes, the optical disc apparatus of this preferred embodiment can remove fingerprints and dust quickly almost as intended. For that purpose, according to this preferred embodiment, the fingerprint detector 116 outputs not only the fingerprint signal but also a signal representing the presence of any other non-fingerprint defect (which will be referred to herein as a "defect signal"). The fingerprint detector 116 of this preferred embodiment is designed so as to output a signal representing the presence of a non-fingerprint defect if the pulse width (i.e., H width) of the fingerprint dot signal falls outside of the predetermined range. More specifically, if H width≦t1 or H width≧t2 is satisfied, the defect signal is output. Alternatively, the defect signal may also be output if the pulse-to-pulse interval (i.e., L width) of the fingerprint dot signal is greater than a reference value t3 (i.e., if L width>t3 is satisfied). In this manner, the fingerprint and non-fingerprint defects can be recognized by the fingerprint signal and the defect signal, respectively.

Hereinafter, it will be described with reference to FIG. 13 how to clean an optical disc with both of these brushes.

First, in Step ST1, fingerprints and defects other than the fingerprints are detected at the same time using the fingerprint detector 116 modified as described above. Those defects are preferably detected quickly during the disc loading process. For that purpose, the optical disc is preferably scanned for any defects while being rotated at 2×, 4× or any other high speeds, and fingerprints and other defects are preferably detected by sensing increases and decreases in the amplitude of the RF signal. Furthermore, to locate the fingerprint detected, the disc is scanned roughly to estimate its approximate location based on the increase and decrease in the amplitude and then scanned finely around the approximate location, thereby finding the exact location. If the modified fingerprint detector 116 described above has detected a non-fingerprint defect based on the defect signal, the process advances to Step ST2, in which the disc is cleaned automatically with the dust wiping brush. For example, the dust wiping brush may have a relatively large size and may be designed to sweep the surface of the disc lightly and evenly without being pressed against the surface of the disc so strongly. As a result, most of the dust or dirt other than fingerprints can be removed.

On the other hand, if the modified fingerprint detector 116 has detected a fingerprint based on the fingerprint signal, then the process advances to Step ST3, in which the automatic cleaning of the present invention, specially designed to remove fingerprints, is carried out with the fingerprint wiping brush 108. In this processing step, after the fingerprint has been detected, the focus servo is once suspended and either the fingerprint wiping brush 108 or cleaning cloth is pressed against the disc and run a predetermined number of times (of rotation), thereby removing the fingerprints.

Usually there are fingerprints and other defects on an optical disc. That is why after the processing steps ST2 and ST3 have been performed, the process goes back to the processing step ST1 to detect defects all over again. Specifically, in Step ST1, defects are detected with the focus and tracking controls turned ON again and the automatic wiping of dust and fingerprints is finished unless the amplitude of the RF signal increases or decreases.

On the other hand, if defects other than fingerprints have been detected based on the defect signal or if a fingerprint has been detected based on the fingerprint signal, then the focus servo is suspended again and the wiping operations are carried out all over again in Steps ST2 and ST3. If either the fingerprint detector 116 or means for detecting defects other than fingerprints has detected any defect as a result, it is determined, by the waveform of a signal representing that defect, that the dust on the optical disc should be wiped away with the dust wiping brush or that the fingerprint that has been located on the optical disc by the fingerprint detecting means should be wiped away with the fingerprint wiping brush 108.

In Step ST4, the maximum number of times of this retry is defined to be twice (i.e., the maximum number of times of defect detection should be three times). If even after the retry operation has been performed twice, the amplitude of the RF signal still increases and decreases and if fingerprints and other defects still have not been removed completely yet, then it is determined, in Step ST5, that there is an unexpected type of hard defect other than fingerprints or that the cleaner should have deteriorated badly. In that case, the alert that says "please check the optical disc or exchange cleaners" is either conveyed or displayed to the host (user).

To take advantage of the high storage density and big storage capacity of BDs fully, people are now exploring options to use them in industrial and medical applications. As already mentioned in the background section, there is an increasing demand for schemes and systems that guarantee higher reliability than conventional ones. Under the circumstances such as these, it is very beneficial to exactly locate a fingerprint left on a disc and/or get the fingerprint wiped away automatically with a dedicated cleaner by adopting the idea of the present invention. Also, it is no less beneficial to remove not just fingerprints but also dust at the same time by using the technique of this preferred embodiment.

Furthermore, as for car navigators, car BD players and other devices to be used in cars, a person who is driving a car is much more likely to leave a fingerprint on an optical disc to be newly loaded compared to a situation where a fixed recorder or player is used. According to a conventional technique, a defect, if any, is automatically detected during a disc loading process, and an alert "wipe the disc" is displayed to prompt the user to clean the disc. However, the same alert is also displayed even if the defect detected is just a graze or an uneven portion of the base member, not a fingerprint or dust, thus often making the user feel uncomfortable. What is more, the user cannot know exactly what part of the 12 cm disc needs to be wiped. That is to say, even if the user believes he or she has wiped the disc well, the wiped part does not always agree with the location where the fingerprint has actually been detected, and the same alert may be displayed over and over again. By adopting the technique of this preferred embodiment, however, the frequency of occurrence of such frustrating situations can also be reduced significantly.

Hereinafter, another type of processing will be described with reference to FIG. 14.

The optical disc apparatus of this preferred embodiment has a CL button, which allows the user to instruct the optical disc apparatus to detect defects on a given optical disc anytime he or she feels it necessary.

First, the optical disc apparatus is loaded with an optical disc. After that, in Step ST11, it is determined whether or not the CL button has been pressed.

If the answer is NO, the optical disc apparatus enters a READY state. On the other hand, if the answer is YES, then a defect search operation is carried out in Step ST12. Optionally, such a CL button may be omitted from the optical disc apparatus. In that case, when loaded with an optical disc, the optical disc apparatus may determine whether the defect search operation should be performed or not, regardless of the user's intention.

Next, in Step ST13, it is determined, based on the result of the defect search, whether or not there is any defect. If the answer is NO, the optical disc apparatus enters the READY state. On the other hand, if the answer is YES, then it is determined, in Step ST14, whether or not the defects have been detected less than three times. If the answer is YES, then it is determined, in Step ST15, whether the defect is a fingerprint or not. And the type of the brush for use to do cleaning is determined depending on whether the defect detected is a fingerprint or not. Specifically, if the defect detected is a fingerprint, the fingerprint wiping brush is selected and the fingerprint is wiped with that brush in Step ST16. On the other hand, if the defect detected is not a fingerprint, the dust wiping brush is selected and the dust is wiped away with the brush in Step ST17.

After these wiping jobs have been done, a defect check is made in Step ST18 to see if there is any other defect left. This defect check is basically the same as the defect search operation that was performed first. However, unlike the defect search, the defect check can be made by repeatedly performing the same fingerprint/dust detecting operation on the area where a fingerprint or dust was detected for the first time. That is why the defect check can be done more quickly than a normal defect search.

After the defect check has been made, the process advances to Step ST13. If another defect has been detected in Step ST13, the same cleaning and defect check processing steps are performed all over again. If a defect is still detected even after the cleaning operation has been performed twice, then the defect has been detected three times in total. In that case, no cleaning is performed anymore and the optical disc apparatus enters the READY state. Even so, some measure is preferably taken. For example, data should not be written on the area with the defect.

The processing flow described above shows how the processing may be performed in a situation where the optical disc apparatus includes both the dust wiping brush and the fingerprint wiping brush. However, if the optical disc apparatus includes only the fingerprint wiping brush, the automatic cleaning with the dust wiping brush is not carried out. In that case, the user may be notified of the presence and location of dust and prompted to do cleaning by himself or herself.

Optionally, as soon as the CL button has been pressed, the automatic cleaning may be carried out immediately with the defect search processing step ST12 skipped. This option is left because in that case, the cleaning mechanism of the optical disc apparatus can also be used even if the user has detected a fingerprint or dust with his or her own eyes. Also, in that case, the user may even specify an area on the optical disc where cleaning should be carried out. This is because if the location of the fingerprint is already known, it is not efficient to clean the entire surface of the optical disc.

Hereinafter, still another type of processing will be described with reference to FIG. 15.

According to this processing flow, the optical disc apparatus does not carry out the automatic cleaning but notifies the user of the type and location of a defect detected.

First, when loaded with an optical disc, the optical disc apparatus performs a defect search operation in Step ST21.

Next, in Step ST22, it is determined, based on the result of the defect search, whether or not there is a defect. If the answer is NO, the optical disc apparatus enters the READY state. On the other hand, if any defect has been detected, one of multiple different types of processing is carried out according to the number of times the defect has been detected. That is to say, if it has been determined in Step ST23 that a defect has been detected just once, then the process advances to Step ST24 to post an alert "wipe the fingerprint" or "wipe the dust" (if the defect is dust). This alert preferably includes information about the exact location of that defect.

If the optical disc apparatus is loaded again with the same optical disc after the using has wiped the defect away from the disc, then a defect check operation is performed in Step ST25. This defect check can be done by determining whether or not a fingerprint has been detected only on the area where a fingerprint was detected for the first time.

If no defect has been detected in Step ST22 after the defect check has been made, the optical disc apparatus enters the READY state. In that case, an alert such as "fingerprint has been removed" may be posted.

On the other hand, if any defect has been detected in Step ST22, then it is determined in Step ST23 that this is the second time any defect has been detected, and the process advances to Step ST26, in which an alert such as "wipe the fingerprint away again" or "wipe the dust" (if the defect is dust) is posted.

When the optical disc apparatus is reloaded with an optical disc after the user has wiped the fingerprint or dust away for the second time, the operation of detecting a defect again (i.e., a defect check) is carried out one more time in Step ST25.

If no defect has been detected in Step ST22 after the defect check has been made, the optical disc apparatus enters the READY state. In that case, an alert such as "fingerprint has been removed" may be posted.

On the other hand, if any defect has been detected in Step ST22, then it is determined in Step ST23 that this is the third time any defect has been detected, and the process advances to Step ST27, in which an alert such as "the fingerprint can't be wiped" or "the dust can't be wiped" (if the defect is dust) is posted. After such a message has been posted, the optical disc apparatus enters the READY state without prompting the user to perform any further wiping.

In the processing flow described above, the user is no longer required to do cleaning when any defect is detected for the third time. Alternatively, this number of times may be twice or four times or more.

EMBODIMENT 4

Compared to a normal data area (which may be a TV program recording area) on an optical disc, a special-purpose area thereof, called a "management area" (which is often arranged around the inner edge of a disc), should guarantee a higher degree of reliability for the data stored there (i.e., management information). That is to say, if the management information were written on the management area spotted with a fingerprint and became unreadable after that, then the program data, the entire TV program data, or even every data on the optical disc could become no longer readable.

Thus, the optical disc apparatus of this preferred embodiment checks the management area for any fingerprints before management information is added to, updated in, the management area during a disc loading process, a disc unloading process, or when a recording operation is started or finished. More specifically, the optical disc is rotated to perform a focus servo operation and a tracking servo operation and carry out various types of learning. After address information has been obtained in this manner, the optical pickup is moved to the management area to scan the entire management area with a light beam.

In this case, by supplying the output of the RF servo amplifier 104 shown in FIG. 9 to the fingerprint detector 116, it is determined, by the method described above, whether or not there is a fingerprint. If no fingerprint has been detected in either a portion of the management area that is broad enough to write the management data on or the entire management area, then the output signal of the fingerprint detector 116 is not activated. That is why the fingerprint processing section 132 of the system controller 130 gets the I/F circuit 131, the formatter section 123, the modulator 124, the D/A converter 125 and the laser driver 107 perform a write operation to add or update the management information to/in that management area.

On the other hand, if any fingerprint has been detected in the management area, then the output signal of the fingerprint detector 116 is activated. In response to that signal, the fingerprint processing section 132 sends an instruction signal to the I/F circuit 131 and gets an alert that prompts the user to wipe the fingerprint away posted by the host 140. Or the fingerprint processing section 132 sends an instruction signal to the servo controller 106 and gets the fingerprint wiped away automatically by the motor driver 102. Alternatively, instead of wiping the fingerprint away in this manner, the management information may also be written on a portion of the management area with no fingerprints (i.e., on an alternative area). The management area has a much smaller planar area than the other data area. That is why the fingerprint detection or the automatic fingerprint cleaning on the management area can be done in a shorter time.

It should be noted that the management area could include an area where management information was written during the manufacturing process of the disc and cannot be altered by the user. For example, at a particular location that is defined by the physical standard of the optical disc, management information could be stored as an embossed pattern (or pits) or could be represented by varying frequencies or phase modulations of a wobbling track shape. Even before those pieces of management information are read, the management area is also preferably subjected to the fingerprint check. If any fingerprint has been detected there, then the fingerprint is preferably removed before the management information is read out.

An optical disc apparatus according to the present invention can detect more accurately a fingerprint that has been left on a BD or any other next-generation optical disc, which is more sensitive to fingerprints than a DVD is, and can perform a read/write operation more appropriately on the optical disc. That is why the present invention can be used effectively in various types of optical discs on which information can be stored at higher densities than on DVDs.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2007-223421 filed on Aug. 30, 2007 and No. 2008-203537 filed on Aug. 6, 2008, the entire contents of which are hereby incorporated by reference.

What is claimed is:

1. An optical disc apparatus comprising:
an optical pickup including an optical system that converges a light beam on an optical disc and a photodetector that detects light reflected from the optical disc; and
fingerprint detecting means for detecting, based on the output of the photodetector, multiple fingerprint dots on the surface of the optical disc, the fingerprint detecting means confirming the presence of a fingerprint on the optical disc when the count of pulse-like changes in the output of the photodetector during the predetermined period is equal to or greater than a predetermined number, a pulse width of the pulse-like changes representing a fingerprint dot.

2. The optical disc apparatus of claim 1, wherein the fingerprint detecting means includes:
a fingerprint detector that outputs a fingerprint signal indicating whether or not there is a fingerprint; and
fingerprint processing means for determining the size of the fingerprint that the light beam has passed through and a radial location of the fingerprint on the optical disc in accordance with the fingerprint signal.

3. The optical disc apparatus of claim 1, wherein if the fingerprint detecting means has confirmed the presence of a fingerprint on the optical disc, the user is alerted to the presence either visually or audibly.

4. The optical disc apparatus of claim 1, further comprising fingerprint wiping means,
wherein if the fingerprint detecting means has confirmed the presence of a fingerprint on the optical disc, the fingerprint wiping means wipes the fingerprint away.

5. The optical disc apparatus of claim 1, further comprising:
means for detecting defects other than fingerprints; and
dust wiping means for wiping dust away from the optical disc.

6. The optical disc apparatus of claim 5, wherein if either the fingerprint detecting means or the means for detecting defects other than fingerprints has detected any defect, it is determined, by the waveform of a signal representing the defect, that either the dust wiping means or the fingerprint wiping means should wipe away the dust or the fingerprint that has been detected on the optical disc.

7. The optical disc apparatus of claim 1, wherein before management information is written on a management area on the optical disc, the fingerprint detecting means searches the management area for any fingerprint, and
wherein if no fingerprints have been found in the management area, control means is notified of that result by the fingerprint detecting means and gets the management information written on the management area as it is, but
wherein if any fingerprint has been found in the management area, the control means is notified of that result by the fingerprint detecting means and chooses an alternative area from portions of the management area that have no fingerprints, and gets the management information written on the alternative area.

8. The optical disc apparatus of claim 4, wherein before management information is written on a management area on the optical disc, the fingerprint detecting means searches the management area for any fingerprint, and
wherein if any fingerprint has been found in the management area, control means is notified of that result by the fingerprint detecting means, has the fingerprint wiping means wipe the fingerprint away from the management area, and then gets the management information written on the management area.

9. An optical pickup comprising:
an optical system for converging a light beam on an optical disc;
a photodetector for detecting light reflected from the optical disc; and
a fingerprint remover for wiping a fingerprint away from the optical disc in accordance with an instruction given by a control section of an optical disc apparatus, wherein the control section includes a fingerprint detecting means for detecting multiple fingerprint dots on the surface of the optical disc when the count of pulse-like changes in the output of the photodetector, during the predetermined period, is equal to or greater than a predetermined number, a pulse width of the pulse-like changes representing a fingerprint dot, and the control section outputs the instruction when the fingerprint detecting means detects a fingerprint by detecting the multiple fingerprint dots.

10. The optical pickup of claim 9, wherein the fingerprint remover includes a retractable brush and wipes the fingerprint away with the brush sticking out while cleaning the disc.

11. The optical disc apparatus of claim 1, wherein the optical system includes an objective lens that has a larger numerical aperture than that for a DVD.

12. The optical pickup of claim 9, wherein the optical system includes an objective lens that has a larger numerical aperture than that for a DVD.

13. A fingerprint detector for detecting, based on the output of a photodetector, multiple fingerprint dots on the surface of the optical disc, the fingerprint detector detecting the presence of a fingerprint on the optical disc when the count of pulses, which are included in the output of the photodetector, during the predetermined period is equal to or greater than a predetermined number, a pulse width of each of the pulses corresponding to the amount of time it takes for the light beam to cross a fingerprint dot on the optical disc.

14. A fingerprint detector of claim 13, wherein the finger print detector comprises:
a timer for keeping time until a predetermined period passes; and
a counter for counting the number of pulses, which are included in the output of the photodetector, during the predetermined period.

* * * * *